US009498846B2

(12) United States Patent
Weiller et al.

(10) Patent No.: US 9,498,846 B2
(45) Date of Patent: Nov. 22, 2016

(54) SYSTEMS AND METHODS FOR PREVENTING OR REDUCING CONTAMINATION ENHANCED LASER INDUCED DAMAGE (C-LID) TO OPTICAL COMPONENTS USING GAS PHASE ADDITIVES

(75) Inventors: Bruce H. Weiller, Santa Monica, CA (US); Randy M. Villahermosa, Los Angeles, CA (US); Jesse D. Fowler, Cypress, CA (US)

(73) Assignee: The Aerospace Corporation, El Segundo, CA (US)

( * ) Notice: Subject to any disclaimer, the term of this patent is extended or adjusted under 35 U.S.C. 154(b) by 861 days.

(21) Appl. No.: 12/749,410

(22) Filed: Mar. 29, 2010

(65) Prior Publication Data

US 2011/0236569 A1    Sep. 29, 2011

(51) Int. Cl.
*H01S 3/22*    (2006.01)
*B23K 26/12*   (2014.01)
*H01S 3/23*    (2006.01)

(52) U.S. Cl.
CPC ............ *B23K 26/12* (2013.01); *B23K 26/123* (2013.01); *B23K 26/127* (2013.01); *H01S 3/2222* (2013.01); *H01S 3/2391* (2013.01); *Y10T 137/0318* (2015.04); *Y10T 137/8593* (2015.04)

(58) Field of Classification Search
CPC ............ H01S 3/03; H01S 3/036; H01S 3/041; H01S 3/0943; H01S 3/0951; H01S 3/0953; H01S 3/104; H01S 3/134; H01S 3/22
See application file for complete search history.

(56) References Cited

U.S. PATENT DOCUMENTS 4,560,576 A    12/1985  Lewis et al.
5,392,305 A     2/1995  Jakobson
5,472,748 A    12/1995  Wolfe et al.
(Continued)

FOREIGN PATENT DOCUMENTS

JP    02008368 A  *  1/1990

OTHER PUBLICATIONS

Scurlock, Christopher. "A phenomenological study of the effect of trace contaminants on lifetime reduction and laser-induced damage for optics" 2004.*
(Continued)

*Primary Examiner* — Jeffrie R Lund
*Assistant Examiner* — Yuechuan Yu
(74) *Attorney, Agent, or Firm* — Jones Day

(57) ABSTRACT

Systems and methods for preventing or reducing contamination enhanced laser induced damage (C-LID) to optical components are provided including a housing enclosing an optical component, a container configured to hold a gas phase additive and operatively coupled to the housing; and a delivery system configured to introduce the gas phase additive from the container into the housing and to maintain the gas phase additive at a pre-selected partial pressure within the housing. The gas phase additive may have a greater affinity for the optical component than does a contaminant and may be present in an amount sufficient to inhibit laser induced damage resulting from contact between the contaminant and the optical component. The housing may be configured to maintain a sealed gas environment or vacuum.

20 Claims, 15 Drawing Sheets

(56) References Cited

U.S. PATENT DOCUMENTS

| | | | |
|---|---|---|---|
| 5,513,198 A | | 4/1996 | Jakobson |
| 5,629,952 A | | 5/1997 | Bartholomew et al. |
| 5,770,473 A | | 6/1998 | Hall et al. |
| 5,989,654 A | * | 11/1999 | Yoshioka et al. ............. 427/579 |
| 6,620,333 B2 | | 9/2003 | Brusasco et al. |
| 6,642,066 B1 | * | 11/2003 | Halliyal ................ C23C 16/52 257/E21.272 |
| 2001/0050042 A1 | * | 12/2001 | DeSimone et al. ............. 118/52 |
| 2002/0029956 A1 | * | 3/2002 | Allen ....................... 204/157.15 |
| 2002/0142493 A1 | * | 10/2002 | Halliyal et al. ................. 438/14 |
| 2003/0066975 A1 | * | 4/2003 | Okada ........................ 250/492.2 |
| 2004/0112882 A1 | * | 6/2004 | Miyairi et al. ........... 219/121.86 |
| 2004/0182416 A1 | * | 9/2004 | Allen et al. .................... 134/1.3 |
| 2007/0097342 A1 | * | 5/2007 | Gomei et al. .................... 355/53 |
| 2008/0132083 A1 | * | 6/2008 | Matsuura ...................... 438/770 |

OTHER PUBLICATIONS

Hovis, Floyd. "Optical damage at the part per million level: The role of trace contamination in laser induced optical damage" 1994.*

"Laser Chemical Process for Clean Applications in Semiconductor Manufacturing" Yogev et al. SPIE vol. 3933 (2000).*

Schröder et al., *Investigation of UV Laser Induced Depositions on Optics Under Space Conditions in Presence of Outgassing Materials*, Proc. 6th Int'l Conf. on Space Optics, held Jun. 27-30, 2006 at ESTEC, Noordwijk, p. 1-4 (Jun. 2006).

Chen et al., *Contamination Control of Space Based Laser Instruments*, Optical Systems Degradation, Contamination, and Stray Light: Effects, Measurements, and Control II, Proc. SPIE vol. 6291, 629104, p. 1-12 (2006).

Hovis et al., *Optical damage at the parts per million level: The role of trace contamination in laser induced optical damage*, Proc. SPIE vol. 2114, p. 145-153 (1993).

Villahermosa et al., *Managing Contamination-enhanced Laser Induced Damage (CLID)*, Optical System Contamination: Effects, Measurements, and Control 2008, Proc. of SPIE vol. 7069, 706908, p. 1-9 (2008).

Juha et al., *Fullerene decomposition induced by near-infrared laser radiation studied by real-time turbidimetry*, Chemical Physics Letters, vol. 313, p. 431-436 (Nov. 12, 1999).

Arenberg et al., *On the Role of Water in the Laser Conditioning Effect*, ASTM International, p. 430-439 (1988).

Lien et al., *Contamination-induced degradation of space-borne lidars*, Proceed. $23^{rd}$ ILRC, Nara, p. 1-3 (Jul. 2006).

USPTO Notice of Allowance for U.S. Appl. No. 11/614,416, mailed Feb. 26, 2010 (5 pages).

Amendment After Final Office Action for U.S. Appl. No. 11/614,416, dated Feb. 3, 2010 (9 pages).

USPTO Final Office Action for U.S. Appl. No. 11/614,416, mailed Nov. 12, 2009 (5 pages).

Amendment for U.S. Appl. No. 11/614,416, dated Jun. 30, 2009 (18 pages).

USPTO Non-Final Office Action for U.S. Appl. No. 11/614,416, mailed Apr. 2, 2009 (7 pages).

Preliminary Amendment for U.S. Appl. No. 11/614,416, dated Dec. 21, 2006 (10 pages).

USPTO Notice of Allowance for U.S. Appl. No. 13/802,042, mailed Jan. 13, 2016 (5 pages).

* cited by examiner

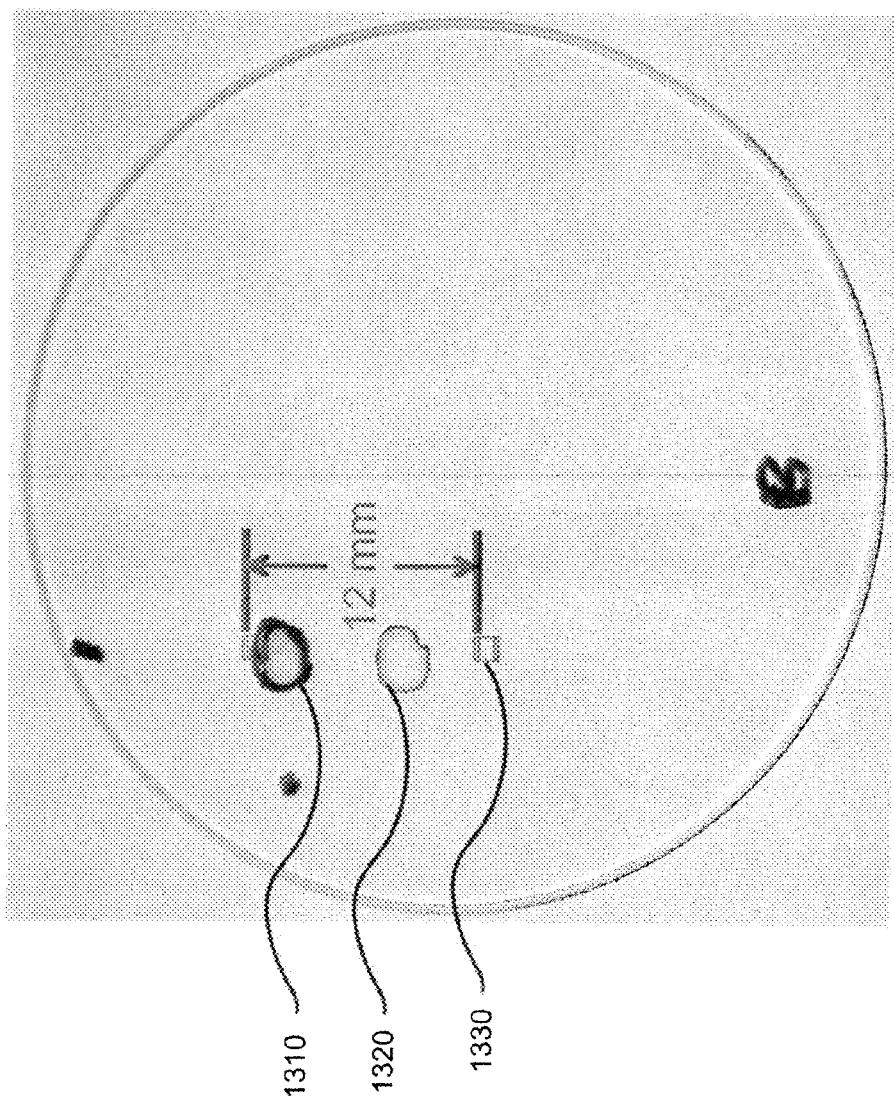

SYSTEMS AND METHODS FOR PREVENTING OR REDUCING CONTAMINATION ENHANCED LASER INDUCED DAMAGE (C-LID) TO OPTICAL COMPONENTS USING GAS PHASE ADDITIVES

FIELD OF THE INVENTION

This application generally relates to preventing or reducing contamination laser induced damage to optical components.

BACKGROUND OF THE INVENTION

It is well known that laser beams may in some circumstances damage optical materials and coatings. Referred to as Laser Induced Damage (LID), it is believed that damage to optical materials may stem from the direct interaction of photons with the material. In particular, it is believed that the electric field component of the laser radiation may interact with surface defects, leading to thermal breakdown. The decomposition of the material may lead to pitting or carbon formation, which in turn may lead to increased material damage and rapid failure of the optic.

To mitigate LID, optical materials that are relatively tolerant to laser damage may be selected for use in laser technologies. After the optical materials are selected, screening tests that are specific to a particular system are conducted. Typically, the tests involve exposing an optic to laser radiation until damage occurs, and then repeating the tests multiple times to collect statistically meaningful information about the Laser Induced Damage Threshold (LIDT) of the optic. The LIDT of the optic is defined to be the number of pulses required to damage the optic, and is measured for a particular coating and optical material against a laser source that is representative of the hardware design (e.g., having the same fluence, wavelength, and pulse width). In some conditions, laser optic materials routinely survive a billion pulses or more.

One known cause of LID to an optical component is molecular and particulate contamination. This contamination may result, for example, from outgassing products that condense onto the optical component. Outgassing is the slow release of a gas that was frozen, trapped, absorbed, or adsorbed in some material. Common sources of gas include moisture, sealants, lubricants, and adhesives, but even metals and glasses can release gases from cracks or impurities. Contaminants, including outgassing products, may degrade optics by causing light transmission loss, increased light scatter, and/or obscuration. While the body of research on these contamination effects extends over multiple decades, a relatively new phenomenon of Contamination Enhanced Laser Induced Damage (C-LID) has only recently gained attention.

C-LID is generally observed when a laser and associated optical components are enclosed in either a vacuum or sealed gas environment (typically nitrogen or air). As such, C-LID is of particular concern during the development of space-based optical systems. Such optical systems are often developed first as a benchtop version that is a functional representation of the space-based version. The benchtop version, however, is not fully analogous to the space-based version, because the benchtop version is typically not enclosed in either a vacuum or sealed gas environment. Therefore, it is common for the benchtop version not to exhibit laser induced damage, and it is typically not until the space-based version is built and enclosed, presumably with the same optical design, that C-LID becomes an issue. For example, it is believed that an open-environment benchtop version may not exhibit C-LID because the contaminants, particularly molecular species, cannot build up in significant concentrations due to open circulation throughout the optical cavity of the benchtop system. In contrast, it is believed that the space-based version may exhibit C-LID because of its vacuum or sealed gas environment. The implication is that standard practices for designing, building, and operating benchtop system to prevent C-LID may not be fully applicable to space-based optical systems when operated in their flight enclosure, e.g., in a vacuum or sealed gas environment.

C-LID may cause laser power to rapidly decay and lead to premature failure of optical components. Encountered during the development of space-based lasers, such as the ones included on the National Aeronautics and Space Administration (NASA) Mars Orbiter Laser Altimeter (MOLA) and Geoscience Laser Altimeter System (GLAS) missions, C-LID has also been observed in laboratory studies. In these reports, optics expected to survive well over 1 million pulses from an infrared laser were observed to fail in as few as 8,000 pulses when contamination was observed to be present.

Certain types of contaminants have been observed to cause C-LID, resulting in accelerated damage to optical components. The most common contaminants include hydrocarbons and silicones. The most widely studied contaminant for C-LID is toluene, also known as methylbenzene. Toluene, a common outgassing compound of epoxies, is relatively volatile, and is a common chemical that has a similar chemical structure to a number of other aromatic hydrocarbon contaminants. Toluene has been observed to induce damage on optics, while some other contaminants such as acetone, a common optics cleaning solvent, have not been observed to induce similar damage.

Several previously-known systems attempt to address C-LID. U.S. Pat. No. 5,770,473 to Hall et al. discloses a package for a high power semiconductor laser that includes a hermetically sealed container filled with a dry gaseous medium containing oxygen, for example air having less than 5000 ppm water. Hall discloses that the oxygen within the packaging atmosphere serves the important function of minimizing laser damage by organic impurities. Hall discloses that there is a downside to using oxygen, namely, that it can react with hydrogen to form water within the laser enclosure. Additionally, Hall discloses that the water, in turn, can adversely affect the overall operation of the electronic components within the enclosure, including the semiconductor laser, by, for example, creating a short circuit between the conductors which interconnect the components. Hall discloses that the use of a getter material that adsorbs or absorbs water in addition to organic impurities, such as porous silica and various zeolites, can help to minimize this problem.

Schröder et al., *Investigation of UV Laser Induced Depositions on Optics Under Space Conditions in Presence of Outgassing Materials*, 6th Int'l Conf. on Space Optics, held 27-30 Jun. 2006 at ESTEC, Noordwijk (2006) discloses that the outgassing of organic material under vacuum conditions combined with high laser fluences can lead to formation of deposits on the optics. Specifically, Schröder discloses an investigation of UV-laser induced deposits on uncoated fused silica optics in a test chamber under simulated space conditions in the presence of outgassing materials. Schröder discloses the use of a Nd:YAG laser and epoxy, silicone, and polyurethane contaminants in the investigation. Additionally, Schröder discloses that for testing the influence of water on the formation of deposits a liquid reservoir with about 50 ml was connected via a needle valve to the chamber, and that the partial pressure of the water vapor in the chamber was measured with a gas type independent capacitance sensor. Schröder discloses a test with an epoxy-based contaminant at a partial pressure of 5 mbar water and compared it with a test without water and stated that water reduced deposit formation significantly.

SUMMARY OF THE INVENTION

Embodiments of the present invention provide gas phase additives to prevent or reduce Contamination Enhanced Laser Induced Damage (C-LID) to optical components. Specifically, the gas phase additive may have a greater affinity for the optical component than does the contaminant, and may be present in an amount (e.g. a partial pressure) selected such that the additive inhibits binding of the contaminant to the surface of the optical component. For example, the additive may be present in an amount selected to substantially cover the surface of the optical component, leaving substantially no area for the contaminant to adsorb or absorb to the surface. The additive thus may reduce or eliminate degradation of the optic through mechanisms such as light transmission loss, increased light scatter, and obscuration. The inhibited degradation may result in longer life for the optical component.

In accordance with one aspect of the invention, a device for reducing contamination laser induced damage to an optical component in a housing caused by a contaminant includes a container that may be configured to hold a gas phase additive and may be operatively coupled to the housing; and a delivery system that may be configured to introduce the gas phase additive from the container into the housing and to maintain the gas phase additive at a preselected partial pressure within the housing. The gas phase additive may have a greater affinity for the optical component than does the contaminant and may be present in an amount sufficient to inhibit laser induced damage resulting from contact between the contaminant and the optical component. The housing may be configured to maintain a sealed gas environment or vacuum.

Some embodiments further include a sensor that may be configured to sense environmental characteristics within the housing.

In some embodiments, the device includes a controller that may be configured to control the delivery system.

In some embodiments, the gas phase additive includes water. In other embodiments, the gas phase additive includes an alcohol. The alcohol may be methanol or ethanol.

In some embodiments, the optical component includes a coating. The coating may enhance the affinity of the gas phase additive for the optical component.

In accordance with one aspect of the invention, a method for reducing contamination laser induced damage to an optical component in a housing caused by a contaminant includes establishing a sealed gas environment or vacuum within the housing; providing a container holding a gas phase additive; and introducing the gas phase additive from the container into the housing. The gas phase additive may have a greater affinity for the optical component than does a contaminant and the gas phase additive may be present in an amount sufficient to inhibit laser induced damage resulting from contact between the contaminant and the optical component.

Some embodiments further include sensing pre-determined environmental characteristics of the housing.

In some embodiments, the method includes controlling the introduction of the gas phase additives into the housing.

In some embodiments, providing a container may include providing a container holding water, alcohol, methanol, and/or ethanol.

BRIEF DESCRIPTION OF THE DRAWINGS

FIG. 13 is an image of three damage sites produced on a substrate from three experiments with flowing mixtures of toluene, nitrogen, oxygen, and/or ethanol.

DETAILED DESCRIPTION

Although techniques to mitigate Laser Induced Damage (LID) have been implemented in the past, these techniques may not be applicable or sufficient to prevent or reduce Contamination Laser Induced Damage (C-LID) to optical components in a vacuum or sealed gas environment, e.g., optical components in a space-based laser when operated in its flight enclosure. The present inventors have recognized that introducing certain gas phase additives into a housing containing an optical component that may be exposed to a contaminant may prevent or reduce C-LID. Specifically, the gas phase additive may have a greater affinity for the optical component than does the contaminant, and may be present in an amount (e.g. a partial pressure) selected such that the additive inhibits binding of the contaminant to the surface of the optical component. For example, the additive may be present in an amount selected to substantially cover the surface of the optical component, leaving substantially no area for the contaminant to adsorb or absorb to the surface. The additive thus may reduce or eliminate degradation of the optic through mechanisms such as light transmission loss, increased light scatter, and obscuration. The inhibited degradation may result in longer life for the optical component.

In some embodiments, the optical component may be treated and/or coated so as to increase the affinity between the surface of the optical component and the additive. For example, the component may be cleaned using a Piranha solution, e.g., a 3:1 mixture of sulfuric acid ($H_2SO_4$) and hydrogen peroxide ($H_2O_2$), that both removes most organic matter from the optical component and hydroxylates the component's surface. This hydroxylation will add OH groups to the surface of the optical component, increasing the hydrophilicity of the surface. A hydrophilic gas phase additive may then be introduced into the optical component's enclosure in an amount sufficient to inhibit laser induced damage resulting from contact between the contaminant and the optical component, e.g., using a device for reducing C-LID such as described herein. Because the gas phase additive is selected so as to have a greater affinity for the optical component than does the contaminant, the gas phase additive will bond with the additional OH groups on the surface of the optical component, thereby inhibiting the contaminant molecules from binding to the surface. The surface of the optical component alternatively, or additionally, may be coated with any suitable coating to which the additive has an affinity that is greater than an affinity of one or more contaminants in the enclosure.

Figure 1A:
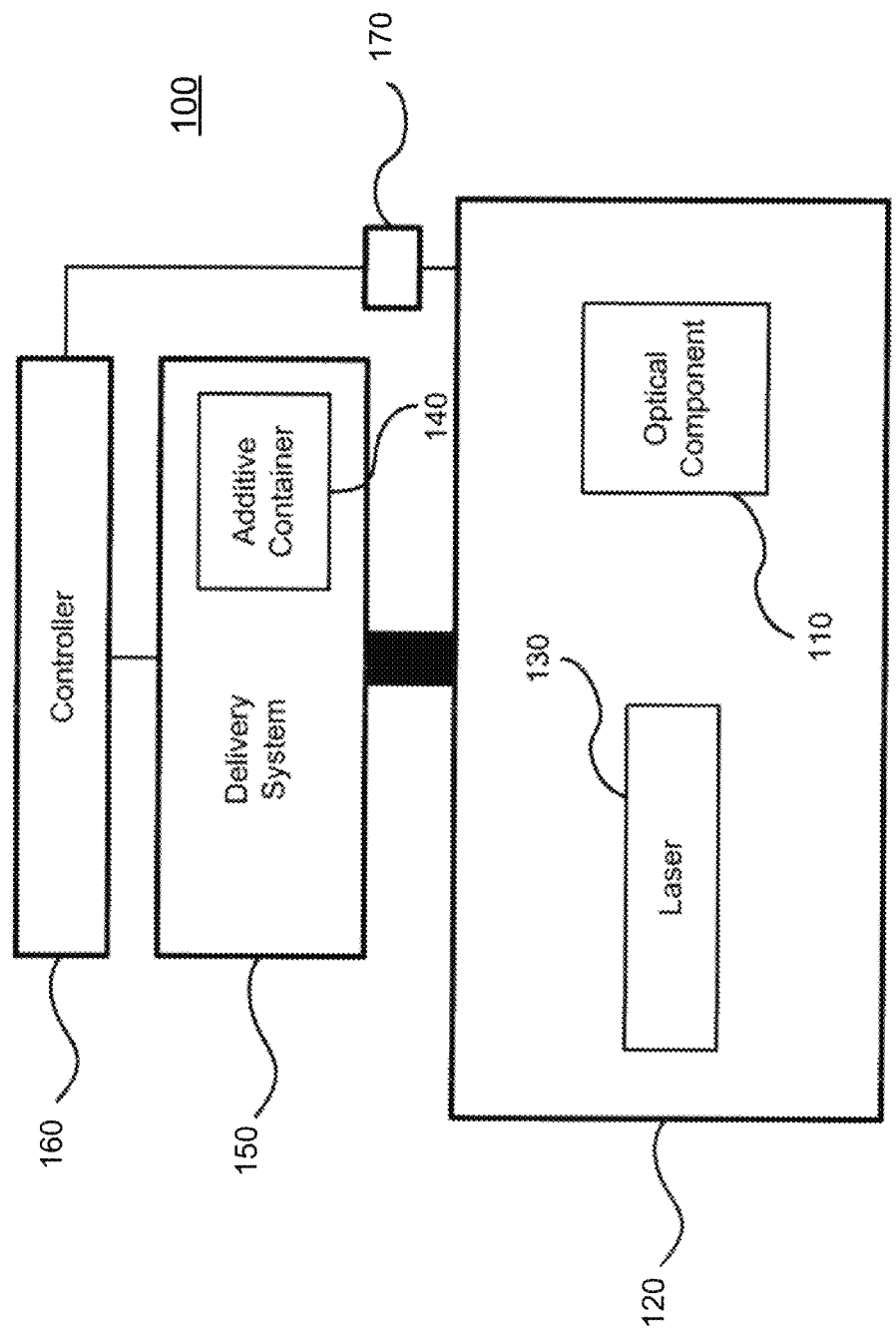
FIG. 1A schematically illustrates an exemplary device for reducing Contamination Enhanced Laser Induced Damage (C-LID) to an optical component, according to some embodiments of the present invention.

FIG. 1A schematically illustrates an exemplary device 100 for reducing C-LID to optical component 110, according to some embodiments of the present invention. Device 100 includes housing 120 having component 110 disposed therein, laser 130, container 140, delivery system 150, controller 160, and sensor 170.

Optical component 110 may be any optic used with laser 130, including an optic disposed within laser 130. Optical component 110 may be suitably treated, e.g., cleaned in a solution known in the art to clean optics, e.g., Piranha solution, before or during use in device 100. Such treatment may enhance the affinity of the gas-phase additive to the component's surface. Optical component 110 also, or alternatively, may be coated with any suitable coating. Such coating may reduce reflections of laser light from the surface of optical component 110, and/or may enhance the affinity of the gas-phase additive to the component's surface. Non-limiting examples of optical component 110 include a bare fused silica substrate, a silica substrate with an anti-reflective (AR) or other coating, and a lens. Optical component 110 may be disposed within housing 120. Housing 120 may be configured to maintain a sealed gas environment or vacuum, and may be any structure suitable for containing optics, and in some embodiments is configured for space flight.

Laser 130 may be any laser suitable for use in housing 120, e.g., a Nd:YAG laser. Laser 130 emits a laser beam that travels through optical component 110. As noted above, optical component 110 may in some embodiments be part of laser 130. In some embodiments, laser 130 is disposed within housing 120, and in other embodiments (not shown), laser 130 is disposed outside housing 120. When laser 130 is disposed outside housing 120, housing 120 may have a window, allowing the laser beam from laser 130 to travel into housing 120 and through optical component 110. Housing 120 may have an exit window, allowing the laser beam to travel from optical component 110 and through the window to exit housing 120.

Gas phase additive container 140 may be configured to hold a gas phase additive and may be operatively coupled to housing 120. The gas phase additive may be any substance that has a greater affinity for optical component 110 than does one or more contaminants within housing 120. The contaminant may be any material that induces C-LID. The gas phase additive may be in gas phase at the operating temperature of system 100, or may be in a condensed form at the operating temperature of system 100, e.g., liquid or solid phase, and suitably vaporized into the gas state. The gas phase additive may be present in an amount sufficient to inhibit laser induced damage resulting from contact between the contaminant and optical component 110, for example, in an amount sufficient to substantially cover the surface of optical component 110. Non-limiting examples of the gas phase additive include water vapor, alcohol, methanol, and ethanol. Alcohols such as methanol or ethanol may in some embodiments be preferred for space-based lasers because they have low freezing points as compared to water. Container 140 may be any suitable structure configured to hold the gas phase additive, whether in gas, liquid, or solid form. In some embodiments, container 140 is disposed within housing 120, and in other embodiments, container 140 is disposed outside housing 120. In some embodiments, device 100 includes an apparatus for circulating the gas phase additive in housing 120, e.g., a fan.

Device 100 includes delivery system 150 configured to introduce the gas phase additive from container 140 into housing 120 and to maintain the gas phase additive at a pre-selected partial pressure within housing 120. Delivery system 150 may be disposed within housing 120 (not shown) or, as illustrated, coupled to housing 120. Container 140 may be disposed within delivery system 150, as illustrated, or coupled to delivery system 150 (not shown).

Device 100 further includes controller 160 and sensor 170. Controller 160 is operatively coupled to delivery system 150, and is configured to control delivery system 150. Specifically, controller 160 may control the quantity and the frequency of gas phase additive introduction to housing 120 from container 140. Controller 160 may communicate with delivery system 150 via wired or wireless signals. Controller 160 may be, for example, a dedicated microcircuit, a processor, or a computer. In some embodiments, controller 160 is disposed within housing 120. In other embodiments, controller 160 is disposed in a remote location outside housing 120 such as on-board a space vessel.

Sensor 170 is operatively coupled to controller 160 and may sense environmental characteristics within housing 120, e.g., concentration of gas phase additive, temperature, and/or pressure. Based on the characteristics sensed by sensor 170, controller 160 may determine the quantity and frequency with which to introduce the gas phase additive. Sensor 170 may communicate with controller 160 via wired or wireless signals. In some embodiments (not shown), sensor 170 is disposed within housing 120. In other embodiments, as illustrated, sensor 170 is disposed outside housing 120 and operatively coupled to housing 120.

Delivery system 150 may introduce a gas phase additive into housing 120 through various mechanisms. In some embodiments, delivery system 150 may include a valve disposed between container 140 and housing 120, the valve being controlled by controller 160. When the valve is opened, the gas phase additive enters housing 120. Delivery system 150 and/or sensor 170 optionally may be detachable from housing 120.

In some embodiments, container 140 may be a pressurized gas bottle, and when controller 160 opens the valve, gas phase additives may flow from the high pressure environment to the low pressure environment, for example, from container 140 to housing 120.

In other embodiments, delivery system 150 may include a pressurized gas source and at least one valve, and container 140 may be a bubbler. A bubbler may include a reservoir for a liquid, e.g., a gas phase additive, and a pathway for gas to pass through that liquid so as to uptake molecules of that liquid and introduce the molecules into a housing, e.g., housing 120. One valve may be coupled to the pressurized gas source and the bubbler, and another valve may be coupled to the bubbler and an inlet to housing 120. Controller 160 may open the first valve, releasing the pressurized gas into the bubbler which contains the gas phase additive allowing the gas phase additive to attach to the gas. Then, controller 160 opens the second valve to release the pressurized gas with the gas phase additive into housing 120 via the inlet.

In some embodiments, delivery system 150 may include a heated tube coupled to an inlet to housing 120, and a dip tube and nozzle. The dip tube and nozzle may be coupled to container 140. In this embodiment, container 140 may be a pressurized aerosol bottle containing a condensed, liquid gas phase additive. Controller 160 activates the nozzle allowing gas phase additives to travel into the heated tube via the dip tube. The heated tube vaporizes the condensed, liquid gas phase additives, and from the heated tube, the additives travel into housing 120 via the inlet.

In another embodiment, delivery system 150 for introducing the gas phase additive into housing 120 may include a pressurized gas source, at least one valve, and a heater. In this embodiment, container 140 is disposed between the pressurized gas source and an inlet to housing 120. Container 140 holds a high surface area solid called a sorbent, e.g., Tenax, zeolite, polymer, or a metal oxide framework, and the gas phase additive is adsorbed onto the sorbent. The heater heats the sorbent to desorb the gas phase additive into the atmosphere. Controller 160 may release gas from the pressurized gas source which travels through the heated sorbent and into housing 120. When the gas travels through the sorbent, desorbed gas phase additive particles are carried with the gas into housing 120. A first valve disposed between the pressurized gas source and the sorbent, and a second valve disposed between the sorbent and the inlet to housing 120 may be controlled by controller 160 to pulse gas into housing 120. Alternatively, an apparatus for circulating the gas phase additive in housing 120, e.g., a fan, may be used in place of the pressurized gas source.

Delivery system 150 may maintain the gas phase additive at a pre-selected partial pressure using controller 160 and sensor 170. Specifically, when sensor 170 measures the pressure within housing 120, delivery system 150 may introduce the gas phase additive into housing 120 as directed by controller 160 if the pressure in housing 120 is not the pre-selected partial pressure. The introduction of the gas phase additive will adjust the partial pressure to that of the pre-selected partial pressure as directed by controller 160.

Figure 1B:
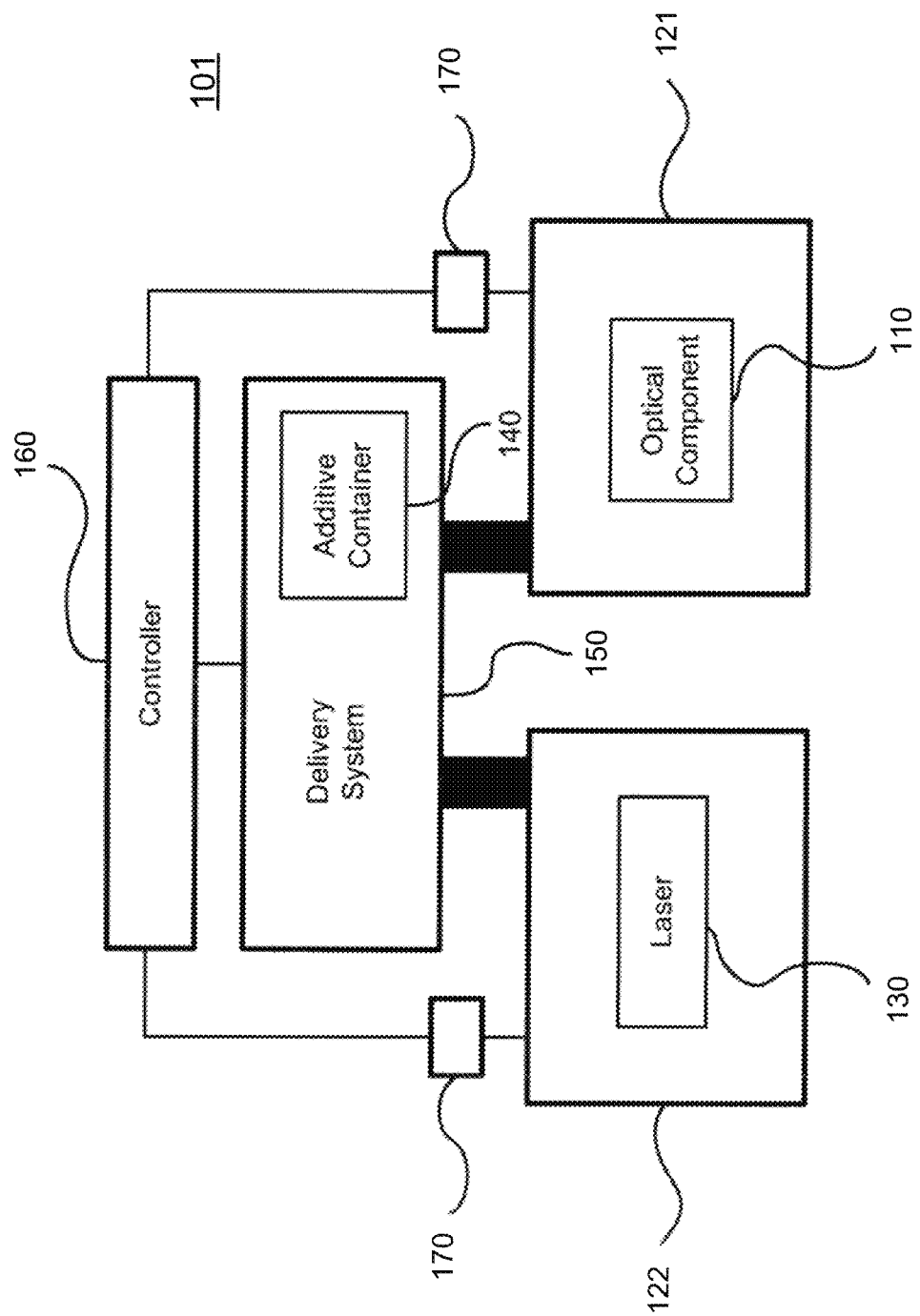
FIGS. 1B and 1C schematically illustrate exemplary variations of the device from FIG. 1A for reducing C-LID to an optical component, according to some embodiments of the present invention.

FIG. 1B schematically illustrates an exemplary variation of device 100 from FIG. 1A for reducing C-LID to optical component 110, according to some embodiments of the present invention. Device 101 may be designed in a similar manner as device 100 from FIG. 1A, except device 101 may further include two sensors 170, optical housing 121, and laser housing 122. Optical component 110 is disposed within optical housing 121, while laser 130 (which may include its own optics subject to C-LID degradation) is disposed within laser housing 122. Because an additional housing (laser housing 122) is included in device 101, an additional sensor 170 may be included to sense characteristics within that housing, e.g., concentration of gas phase additive, temperature, and/or pressure. Delivery system 150 may further introduce the gas phase additive into both laser housing 122 and optical housing 121 and maintain the gas phase additive within the respective housings at a pre-selected partial pressure. These variations are illustrated in FIG. 1B where optical housing 121 is coupled to sensor 170 and delivery system 150, and laser housing 122 is coupled to sensor 170 and delivery system 150. Any suitable number of housings and sensors may be provided, with delivery system 150 coupled thereto.

Figure 1C:
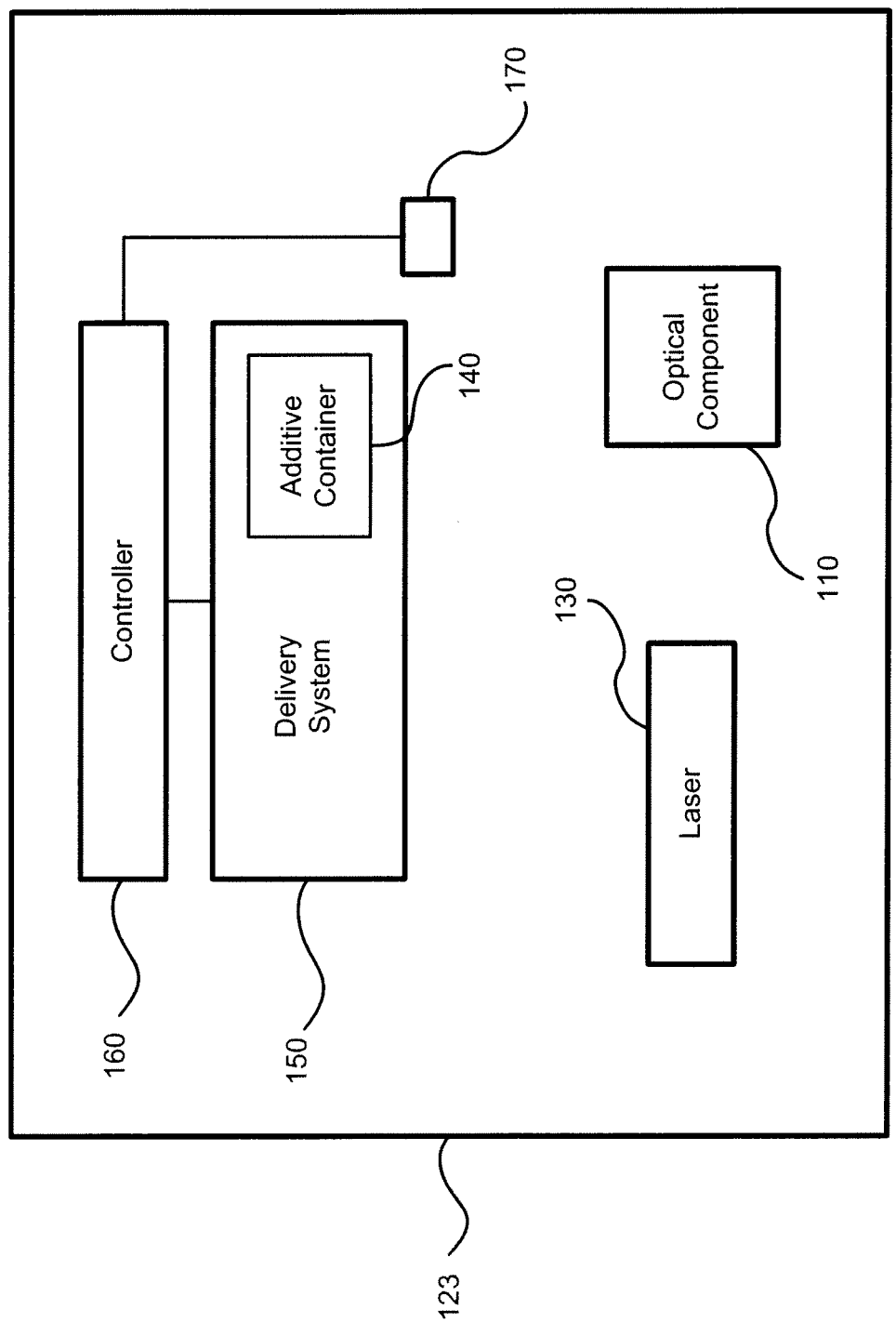

FIG. 1C schematically illustrates another exemplary variation of device 100 from FIG. 1A for reducing C-LID to optical component 110, according to some embodiments of the present invention. Device 102 may be designed in a similar manner as device 100 from FIG. 1A, except container 140, delivery system 150, controller 160, and sensor 170 are illustrated as disposed within the housing, referred to as housing 123. In this embodiment, delivery system 150 introduces a gas phase additive from container 140 into housing 123. As described above with respect to FIG. 1A, each of laser 130, controller 160, and/or sensor 170 may be disposed either inside or outside of housing 123, according to various embodiments of the present invention.

Devices 100, 101, and 102 may be used, for example, in a wide range of applications. These applications may include, but are not limited to, laser ranging, laser altimetry, Light Detection and Ranging (LIDAR), laser communication, laser sensing, and/or laser power beaming. Such applications may be space-based, may be based on a mobile platform such as an aircraft or ground-based vehicle, or may be associated with a fixed location. Other applications may include medical lasers for surgery and other procedures, and high power lasers for laser fusion.

Figure 2:
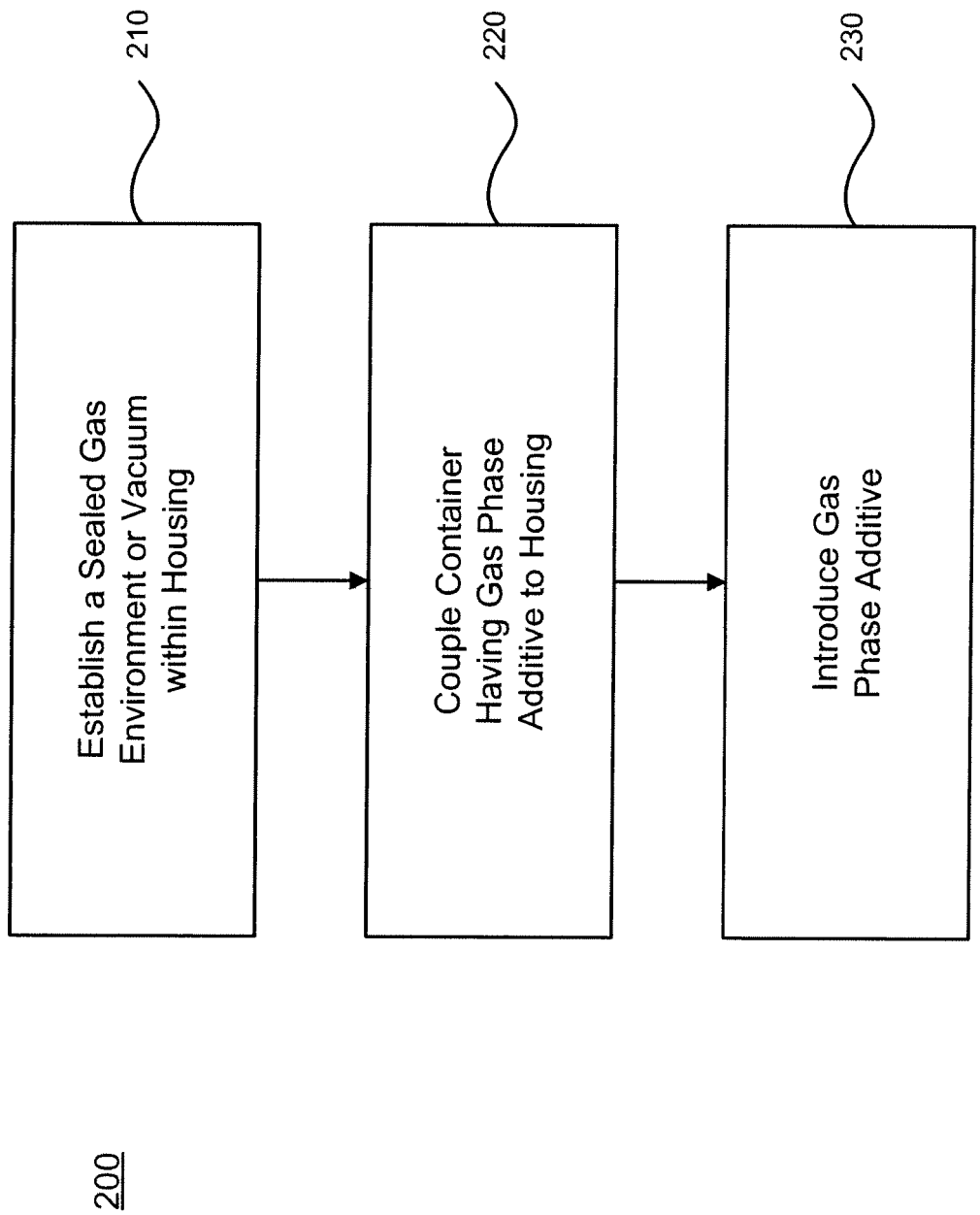
FIG. 2 illustrates an overview of an exemplary method for reducing C-LID to an optical component, according to some embodiments of the present invention.

FIG. 2 illustrates an exemplary method 200 for reducing C-LID to an optical component in an enclosed housing, according to some embodiments of the present invention. First, at step 210, a housing establishes a sealed gas environment or vacuum about the optical component. The housing may be sealed using suitable techniques known in the art to create a sealed gas environment. For example, the housing may be in a vacuum because the housing is in space. Or, for example, a vacuum may be achieved within the housing suitable techniques known in the art, e.g., using a turbo-pump or rough pump.

Next, at step 220, a container configured to hold a gas phase additive is provided. The container may be coupled to the housing and may be disposed within the housing. As noted above with respect to FIG. 1A, the container may be any structure configured to hold the gas phase additive, whether in gas, liquid, or solid form. Non-limiting examples of the container include a pressurized bottle, a bubbler, an aerosol bottle, or a device for holding a sorbent. The gas phase additive may be any substance that has a greater affinity for the optical component than does one or more contaminants within the housing. The contaminant may be any material that induces C-LID. The gas phase additive may be in gas phase form or in a condensed form, e.g., liquid or solid state. The gas phase additive may be present in an amount sufficient to inhibit laser induced damage resulting from contact between the contaminant and the optical component. Non-limiting examples of the gas phase additive include water, alcohol, methanol, and ethanol. Alcohols such as methanol or ethanol are useful for space-based lasers because they have low freezing points as compared to water.

Finally, at step 230, the gas phase additive from the container is introduced into the housing. As noted with respect to FIG. 1A, this introduction may be achieved by using at least one delivery system, controller, and sensor, according to some embodiments of the present invention. The container provided may be suitably connected to the delivery system, allowing the gas phase additive to be introduced to the housing via the delivery system. The controller controls the delivery system, and specifically controls the quantity and the frequency of the gas phase additive introduction to the housing from the container. The sensor senses pre-determined environmental characteristics within the housing, e.g., concentration of gas phase additive, temperature, and/or pressure. As described above, the introduction of gas phase additives into the housing may include releasing the gas phase additive into the housing via an optionally detachable delivery system; releasing the pressurized gas phase additive into the housing; flowing a gas through a bubbler such that the gas includes the gas phase additive and releasing the gas into the housing; releasing a gas phase additive into the housing an aerosol device; or flowing a gas through a sorbent with the gas phase additive adsorbed onto the sorbent and into the housing.

In some embodiments, method 200 may further include generating a laser beam with a laser, e.g., a Nd:YAG laser. The laser beam travels through the optical component. Method 200 reduces or prevents C-LID to the optical component from the laser beam.

In some embodiments, providing a container at step 220 may include providing a container holding water, alcohol, methanol, and/or ethanol.

Method 200 may be used, for example, in a wide range of enclosed-housing laser applications, including space-based laser applications. These applications may include, but are not limited to, laser ranging, laser altimetry, Light Detection and Ranging (LIDAR), laser communication, laser sensing, and/or laser power beaming. Other applications may include medical lasers for surgery and other procedures, and high power lasers for laser fusion.

EXAMPLE

The functionality of devices 100, 101, and 102 and method 200 for reducing C-LID to an optical component in a housing may be illustrated by way of Example as described below.

1. Experimental Set-Up

Figure 3:
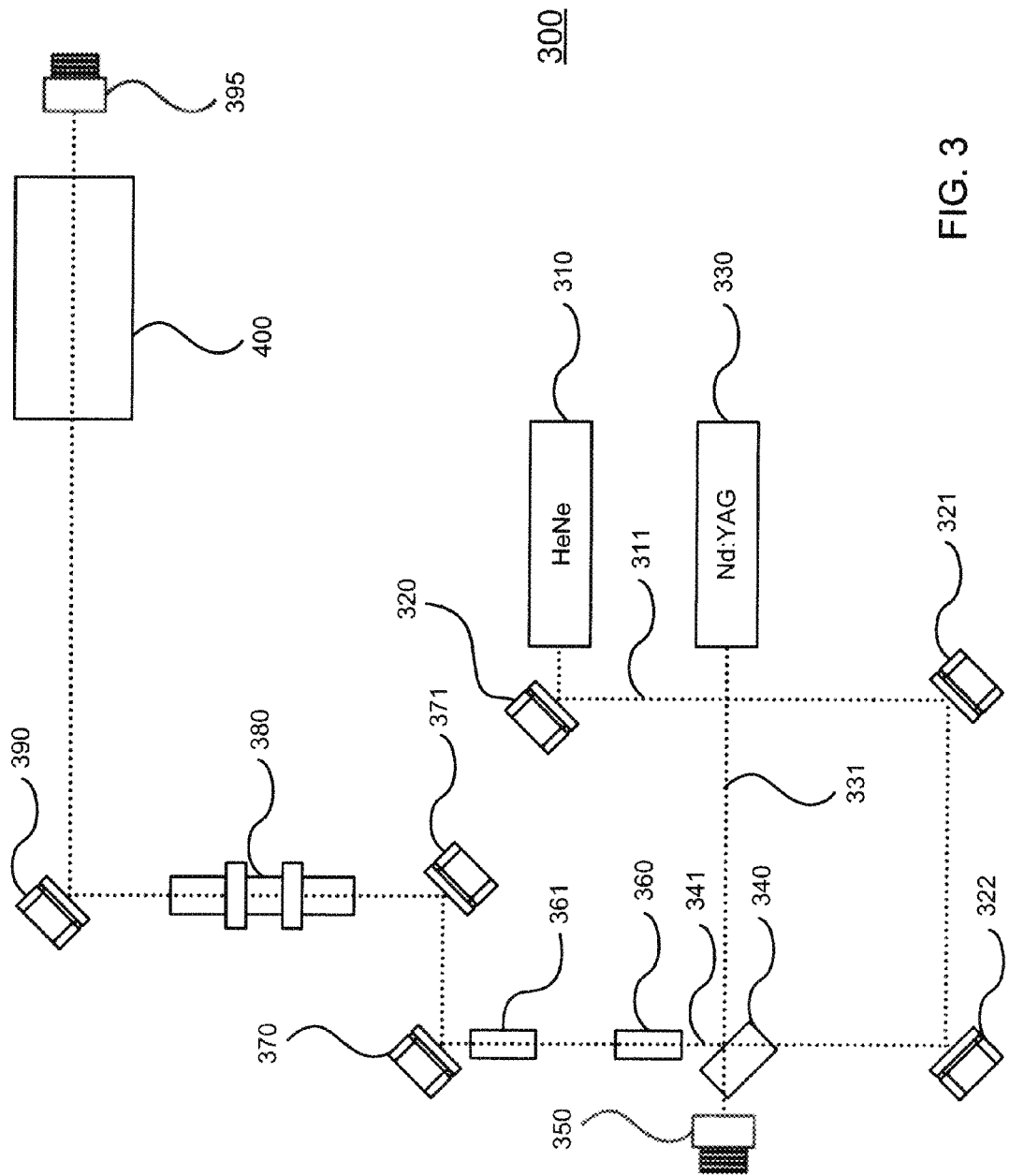
FIG. 3 schematically illustrates a high-level view of a C-LID test apparatus.

FIG. 3 is a schematic view of C-LID test apparatus 300, which may be used to measure Laser Induced Damage Threshold (LIDT) and the extent of C-LID on bare fused silica substrates in vacuum conditions. Apparatus 300 includes Helium Neon (HeNe) laser 310, which generates HeNe laser beam 311; mirrors 320, 321, 322; Nd:YAG laser 330, which generates Nd:YAG laser beam 331; dichroic beam splitter 340; energy meters 350, 395; irises 360, 361; high-power laser mirrors 370, 371, 390; telescope 380; and test chamber 400 which, as described in greater detail below, contains the bare fused silica substrate.

The laser beams in apparatus 300 were aligned before entering test chamber 400. HeNe laser 310 emits HeNe laser beam 311. Mirrors 320, 321, 322 reflect HeNe laser beam 311 to an appropriate point on dichroic beam splitter 340. Nd:YAG laser 330 emits Nd:YAG laser beam 331. Nd:YAG laser 330 is a flash-lamp pumped, 1064 nm pulsed Nd:YAG laser (e.g., Continuum Powerlite II), having a repetition rate of 20 Hz, and a nominal diameter of 10 mm, as determined from burn paper. Nd:YAG laser beam 331 travels to dichroic beam splitter 340 where dichroic beam splitter 340 splits Nd:YAG laser beam 331 into two parts. One part of Nd:YAG laser beam 331 travels to energy meter 350, which measures the transmitted laser energy from Nd:YAG laser beam 331. The second part of Nd:YAG laser beam 331 meets with HeNe laser beam 311 at dichroic beam splitter 340 so that the two beams 311, 331 travel collinearly through the remainder of the system, allowing HeNe laser beam 311 to be used to align Nd:YAG laser beam 331 (illustrated as combined beam 341). Beam 341 travels to irises 360, 361 which are used to align beam 341. High-power laser mirrors 370, 371 appropriately direct beam 341 through telescope 380 (e.g., a Galilean telescope). Telescope 380 is used to collimate beam 341, resulting in a reduction in beam diameter that decreases laser power loss from light scattering. High-power laser mirror 390 directs beam 341 through test chamber 400.

When beam 341 is properly aligned, it enters test chamber 400 and passes through the bare fused silica substrate. Energy meter 395 measures the laser energy transmitted through chamber 400 and the bare fused silica substrate.

Figure 4:
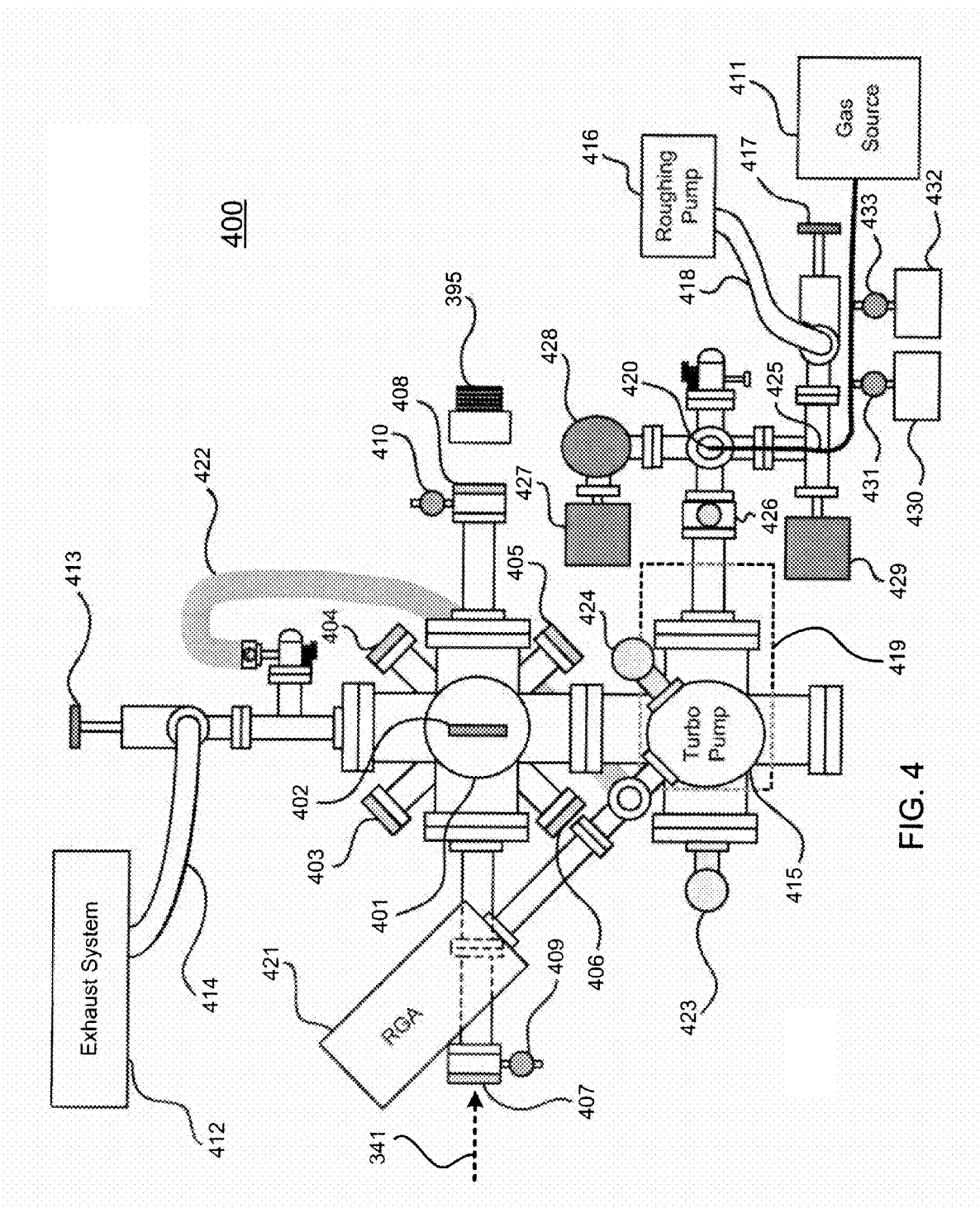
FIG. 4 schematically illustrates a plan view of a C-LID test chamber for use in the apparatus of FIG. 3.

FIG. 4 schematically illustrates a plan view of an exemplary C-LID test chamber 400 suitable for use with apparatus 300 illustrated in FIG. 3. Chamber 400 is used to expose substrate 402 (e.g., a bare fused silica substrate) to a laser beam in vacuum conditions and to introduce gas phase additives. Chamber 400 includes exposure chamber 401 having substrate 402 disposed therein, gas source 411, exhaust system 412, turbomolecular pump 415, roughing pump 416, contaminant bubbler 430, additive bubbler 432, and various view ports, valves, and pieces of measuring equipment, some of which are described in greater detail below and the remainder of which will be familiar to those of ordinary skill in the art of vacuum chambers.

The substrate 402 to be tested, e.g., a bare fused silica substrate, was positioned within exposure chamber 401 so as to allow the substrate to be exposed to the laser beam 341. Exposure chamber 401 is stainless steel and consists of a 6" cross. Substrate 402 is a 2" diameter fused bare fused silica window that was cleaned in a Piranha solution consisting of sulfuric acid ($H_2SO_4$) and hydrogen peroxide ($H_2O_2$). Exposure chamber 401 contains a fixture (not shown) for holding and translating substrate 402 so as to allow automated positioning and testing. View ports 403, 404, 405, 406, 407, 408, e.g., silica windows, are coupled to the exposure chamber 401 via stainless steel tubes with adapter flanges, and are used to visually align substrate 402 within exposure chamber 401. Entrance view port 407 allows beam 341 to travel into test chamber 400 and through substrate 402, while exit view port 408 allows beam 341 to exit test chamber 400 and travel to energy meter 395 following transmission through substrate 402.

To reduce the risk of damage to entrance view port 407 and/or exit view port 408 by beam 341 during the experiment, purge valves 409, 410 are coupled to entrance view port 407 and exit view port 408, respectively. Purge valves 409, 410 may be opened to purge their respective view port 407, 408 with atmospheric gas from gas source 411 via gas lines (not shown), to inhibit contamination buildup. As a result, the transmitted laser energy of beam 341 was believed to be unaffected by damage to entrance view port 407 or exit view port 408.

Test chamber 400 includes exhaust system 412 coupled to exhaust valve 413 via vacuum line 414. Exhaust system 412 is maintained near atmospheric pressure, allowing any introduced gas to continuously flow through the chamber and exit via exhaust system 412. Exhaust valve 413 can be closed to achieve vacuum conditions within test chamber 400.

Vacuum conditions are achieved using turbomolecular pump 415 and roughing pump 416 to simulate a space-based laser operated in its flight enclosure, thus allowing C-LID to be observed. Turbomolecular pump 415 is coupled to exposure chamber 401 via a stainless steel tube with an adapter flange, while roughing pump 416 is coupled to roughing valve 417 via vacuum line 418. Gate valve 419 is used to isolate turbomolecular pump 415 from test chamber 400 while the lasers are activated during the experiments. Both pumps remain on for the full duration of an experiment.

The process for achieving vacuum conditions within test chamber 400 begins by closing purge valves 409, 410, closing exhaust valve 413, and shutting off a gas valve (not shown) at gas inlet 420. Roughing valve 417 is opened, allowing roughing pump 416 to reduce the pressure within exposure chamber to approximately 100 mTorr. Roughing valve 417 is closed and gate valve 419 is opened, allowing turbomolecular pump 415 to reduce the pressure in the chamber to the microTorr region, thereby achieving vacuum conditions. Gate valve 419 is then closed.

Test chamber 400 includes several pieces of measuring equipment used to monitor the vacuum conditions. Residual gas analyzer (RGA) 421 is coupled to turbomolecular pump 415 via a stainless steel tube with an adapter flange, and monitors the quality of the vacuum and detects minute traces of impurities. RGA 421 is coupled to the turbo-pumped portion of the chamber, and operates between $1 \times 10^{-8}$ Torr and $1 \times 10^{-4}$ Torr. Vacuum line 422 is connected between RGA 421 and exhaust valve 413, allowing gases to travel to RGA 421 for measurement after going through exposure chamber 401, while gate valve 419 is closed. Ion gauges 423, 424 are coupled to turbomolecular pump 415, and measure the pressure within test chamber 400 at their respective locations.

After vacuum conditions are achieved, the chamber is filled with gas to create a controlled flowing gas environment. This is accomplished by backfilling test chamber 400 with a gas, e.g., nitrogen and/or oxygen, from gas source 411 via gas line 425, and opening the gas valve, purge valves 409, 410, exhaust valve 413, and butterfly valve 426. Gas from gas source 411 flows into the chamber via the gas valve and purge valves 409, 410, travels through the chamber, and exits through exhaust system 412. There are several pieces of equipment that can be used to monitor the flowing gas environment, including capacitance manometers 427, 428, 429, which measure pressure. Each manometer 427, 428, 429 is respectively calibrated to accurately measure a pressure range, e.g., up to 1 Torr, up to 50 mTorr, or up to 1000 Torr, respectively. In these experiments, only manometer 429 was used.

After the chamber is backfilled, contaminants, if any, and gas phase additives, if any, can be introduced into the chamber via gas line 425. The contaminants, e.g., toluene, are introduced so as to induce C-LID on substrate 402 in a manner that simulates C-LID on optical components in other enclosed laser systems, e.g. space-based systems. The contaminants are disposed within temperature-controlled contaminant bubbler 430, and may be introduced into the chamber by opening bubbler valve 431. The gas phase additives, e.g., water vapor, methanol, or ethanol, are introduced to determine what effects, if any, the additives have on C-LID on substrate 402. The additives are disposed within temperature-controlled additive bubbler 432 in condensed (liquid) form and may be introduced into the chamber by opening bubbler valve 433. Once bubbler valves 431, 433 are opened, gas from gas source 411 flows through bubblers 430, 432 via gas lines (not shown), causing the contaminant and gas phase additive to flow into chamber 400. Approximately one hour was allotted to allow test chamber 400 to reach steady state.

2. Experimental Parameters

For each experiment, test apparatus 300 and test chamber 400 were utilized. After a high level vacuum was achieved and the proper gas phase additives were introduced, substrate 402 was exposed to beam 341 until the transmitted energy of Nd:YAG laser beam 331 as measured by energy meter 395 fell to 80% of its starting value or until $1 \times 10^6$ laser pulses were reached. If Nd:YAG laser 330 generated $1 \times 10^6$ laser pulses at 20 Hz and the transmitted energy did not fall to 80% of its starting value, each experiment lasted 13.9 hours. The pulse energy of Nd:YAG laser 330 was adjusted using a combination of partial reflectors and adjusting the Q-switch timing. The pulse width of Nd:YAG laser 330 was measured to be 13 ns from a digitizing oscilloscope (not shown) and a fast photodiode (not shown). Each experiment was repeated at least nine times for each substrate 402 and each set of conditions. Substrate 402 was automatically translated vertically in approximately 5 mm steps via the fixture and beam 341 was translated approximately 1 cm to create two columns of at least nine exposure spots across substrate 402. After substrate 402 received nine to ten exposure spots, a different, virtually identical substrate 402 was utilized for experimentation.

3. Laser Induced Damage Threshold without Contaminant

Figure 5:
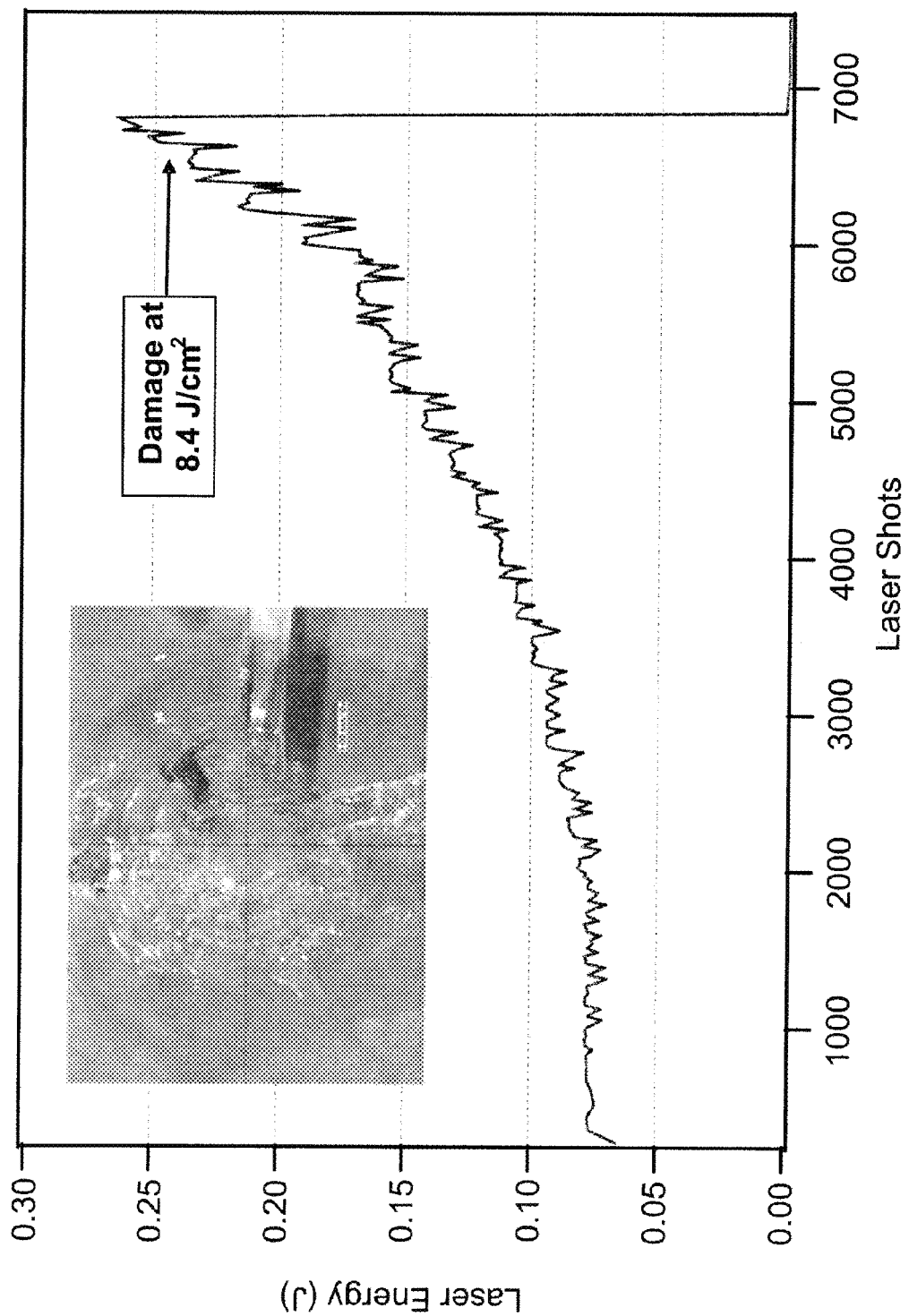
FIG. 5 illustrates the results of a Laser Induced Damage Threshold (LIDT) measurement performed on a bare fused silica substrate under varying laser fluence without any introduced contaminant in the test chamber.

FIG. 5 illustrates the results of a LIDT measurement performed on substrate 402 under varying laser fluence without any introduced contaminant in test chamber 400. In this experiment, beam 341 was focused behind substrate 402 to give a beam diameter at substrate 402 of about 2 mm. FIG. 5 shows a plot of the laser energy in Joules of Nd:YAG laser 330 as measured by energy meter 395 versus the number of laser pulses, and an image of the laser ablation. As seen in FIG. 5, substrate 402 was stable until the laser fluence reached approximately 8.4 J/cm². At this value, the power became high enough to cause laser ablation, cracking and breaking the surface of substrate 402 within a few seconds. The inset of FIG. 5 is an image of this laser ablation, showing a hole that went completely through substrate 402 that was the size of the beam diameter. The image further shows that at the edge of substrate 402, there was cracking and breaking of substrate 402.

4. Laser Induced Damage Threshold with Contamination: Toluene

The next experiments determined the LIDT of substrate 402 with a contaminant in the test chamber 400. The chosen contaminant was toluene. The selected transmitted energy of the Nd:YAG laser 330 was 85 mJ, making the fluence approximately 4 J/cm$^2$. This fluence was chosen as it was lower than the measured LIDT of the substrate, as discussed above with respect to FIG. 5, and is typical of fluences used in space flight laser systems.

Each experiment included preparing test apparatus 300 and test chamber 400 as described above with respect to vacuum achievement, and introducing toluene from contaminant bubbler 430 mixed with nitrogen (N$_2$) and oxygen (O$_2$), if any, from gas source 411 and a gas phase additive, if any, from additive bubbler 431 by way of gas line 425 via gas inlet 420. The gas phase additives selected were water vapor, methanol, and ethanol. A number of experiments were performed: toluene in nitrogen, toluene in synthetic air (20% O$_2$ and 80% N$_2$), toluene in synthetic air with water, toluene in synthetic air with methanol, and toluene in synthetic air with ethanol.

After the experiments were performed, plots were created showing the normalized transmitted energy versus the number of laser pulses (so referred to as "shots") to damage for each experiment. The damage threshold was then calculated for each experiment. The calculated damage threshold was taken as the average number of laser shots, including error, required to cause a 10% drop in transmitted laser energy. An optical component that experienced a 10% drop in transmitted laser energy would be considered a failure to one of ordinary skill in the art.

Figures 6A, 6B:
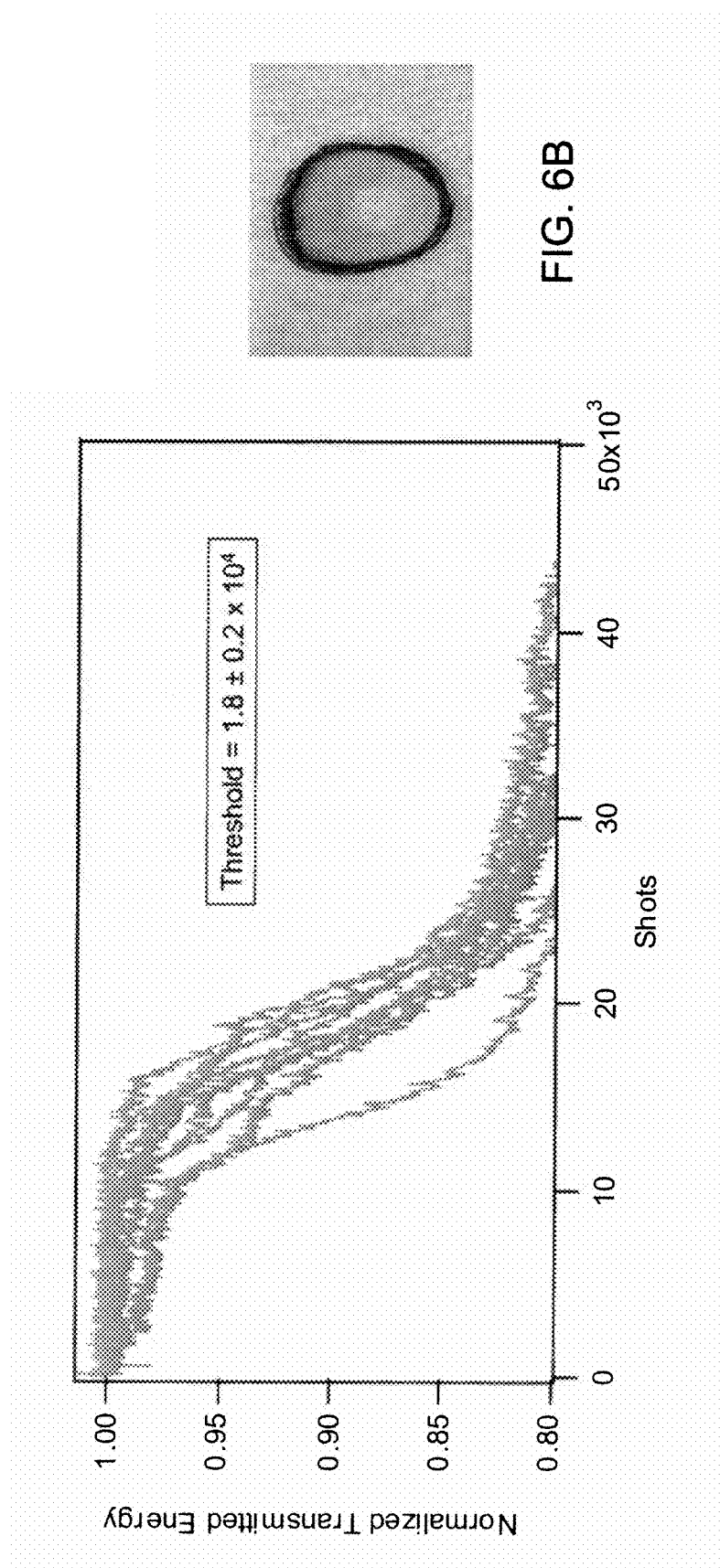
FIG. 6A is a plot illustrating the normalized transmitted energy for a series of threshold measurements performed on a bare fused silica substrate in a flowing mixture of toluene in synthetic air.
FIG. 6B is an image of a damage site produced on the bare fused silica substrate from one threshold measurement described in FIG. 6A.

FIG. 6A is a plot illustrating the normalized transmitted energy for a series of threshold measurements performed on substrate 402 in a flowing mixture of toluene in synthetic air. The concentration of toluene in the flowing mixture was 300 parts per million (ppm). The result of this experiment was a calculated damage threshold for substrate 402 in the flowing mixture of toluene in synthetic air of $(1.8\pm0.2)\times10^4$ shots.

FIG. 6B is an image of a damage site produced on substrate 402 from one threshold measurement described in FIG. 6A. As seen in FIG. 6B, toluene damaged substrate 402 creating a black ring structure that was not damaged in the center. The black ring was graphitic carbon as determined by Raman spectroscopy and, without wishing to be bound by any theory, the inventors attribute the black ring to radical formation from the toluene as a result of laser excitation.

Figure 7:
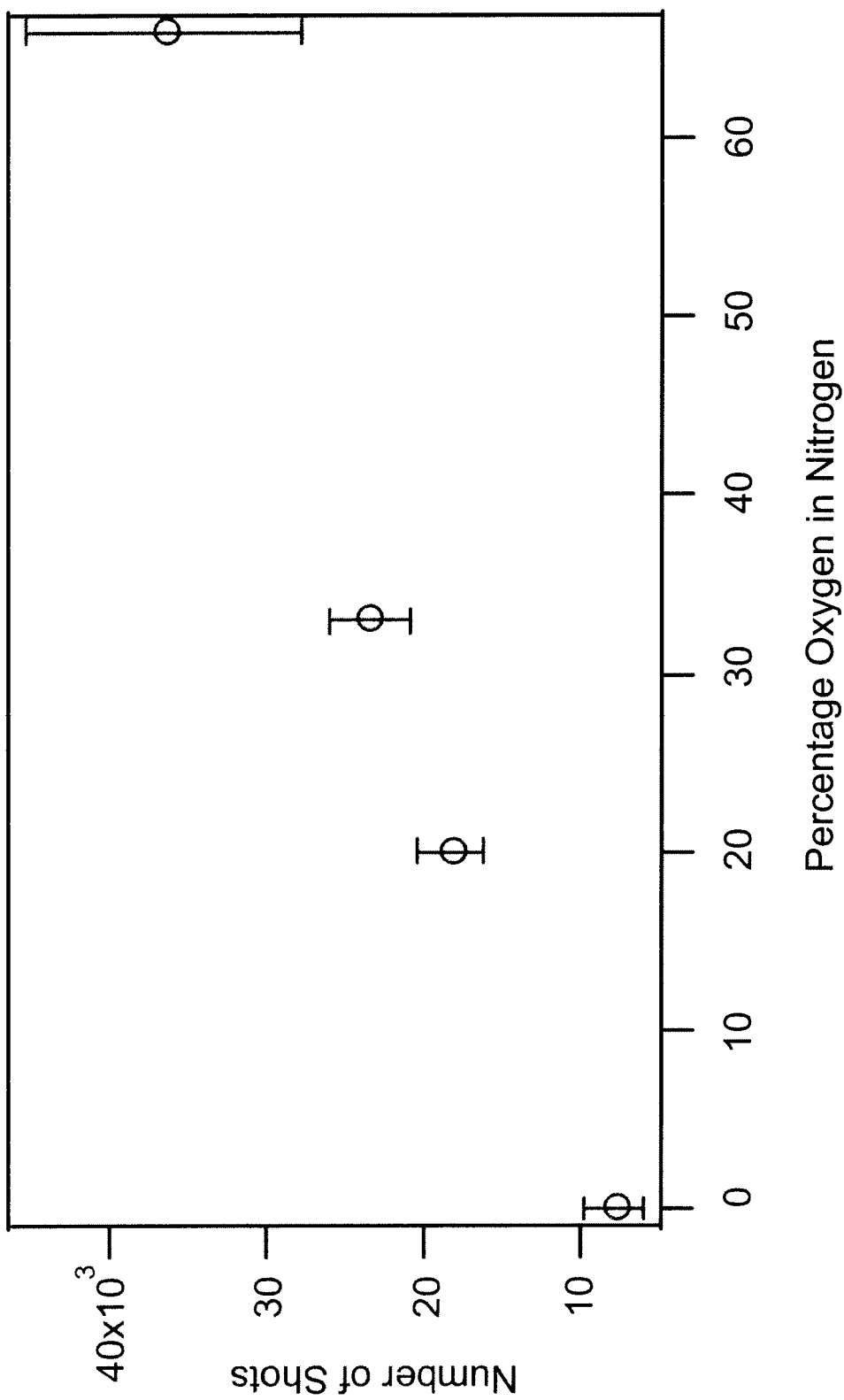
FIG. 7 is a plot illustrating the average number of laser shots measured to cause a 10% drop in transmitted laser energy performed on bare fused silica substrates in varying percentages of oxygen in nitrogen, with error bars shown.

FIG. 7 is a plot illustrating the average number of laser shots measured to cause a 10% drop in transmitted laser energy performed on bare fused silica substrates in varying percentages of oxygen in nitrogen, with error bars shown. The concentration of toluene in the flowing mixtures was 300 ppm. The calculated damage thresholds for varying percentages of oxygen in nitrogen are summarized in TABLE 1.

TABLE 1

| Oxygen Percentage | Nitrogen Percentage | Calculated Damage Threshold (shots) | Number of Experiments |
|---|---|---|---|
| 0 | 100 | $(7.8 \pm 1.8) \times 10^3$ | 15 |
| 20 | 80 | $(1.8 \pm 0.2) \times 10^4$ | 9 |
| 33 | 67 | $(2.4 \pm 0.3) \times 10^4$ | 9 |
| 67 | 33 | $(3.7 \pm 0.9) \times 10^4$ | 10 |

As seen in FIG. 7 and TABLE 1, the calculated damage threshold for substrate 402 increased as the percentage of oxygen in exposure chamber 401 increased. Without wishing to be bound by any theory, the inventors attribute this to the quenching and/or reactivity of oxygen with radicals that may be formed preventing soot formation.

Figure 8:
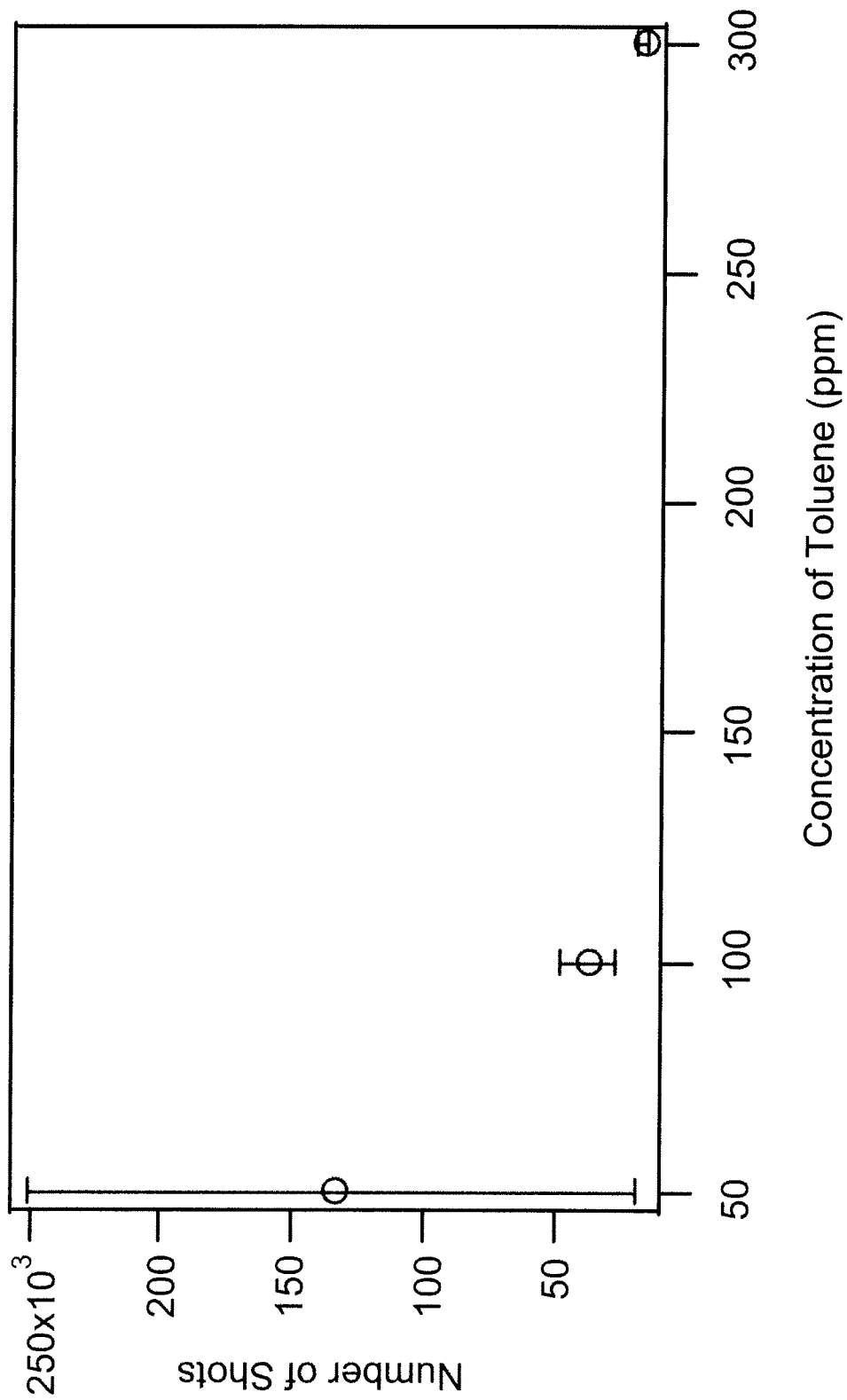
FIG. 8 is a plot illustrating the average number of laser shots measured to cause a 10% drop in transmitted laser energy performed on bare fused silica substrates in varying concentrations of toluene in synthetic air, with error bars shown.

FIG. 8 is a plot illustrating the average number of laser shots measured to cause a 10% drop in transmitted laser energy performed on bare fused silica substrates in varying concentrations of toluene in synthetic air, including error bars. The calculated damage thresholds for varying concentrations of toluene in synthetic air are summarized in TABLE 2.

TABLE 2

| Toluene Concentration (ppm) | Calculated Damage Threshold (shots) | Number of Experiments |
|---|---|---|
| 50 | $(1.3 \pm 1.2) \times 10^5$ | 9 |
| 100 | $(3.8 \pm 1.0) \times 10^4$ | 10 |
| 300 | $(1.8 \pm 0.2) \times 10^4$ | 9 |

As seen in FIG. 8 and TABLE 2, the calculated damage threshold for substrate 402 decreased as the toluene concentration in exposure chamber 401 increased. FIG. 8 verifies that toluene induces damage on optics. There was a large error in the calculated damage threshold at 50 ppm which, without wishing to be bound by any theory, the inventors attribute to inadequate temperature control of contaminant bubbler 430.

5. Laser Induced Damage Threshold with Contaminant and Gas-Phase Additive

Figure 9:
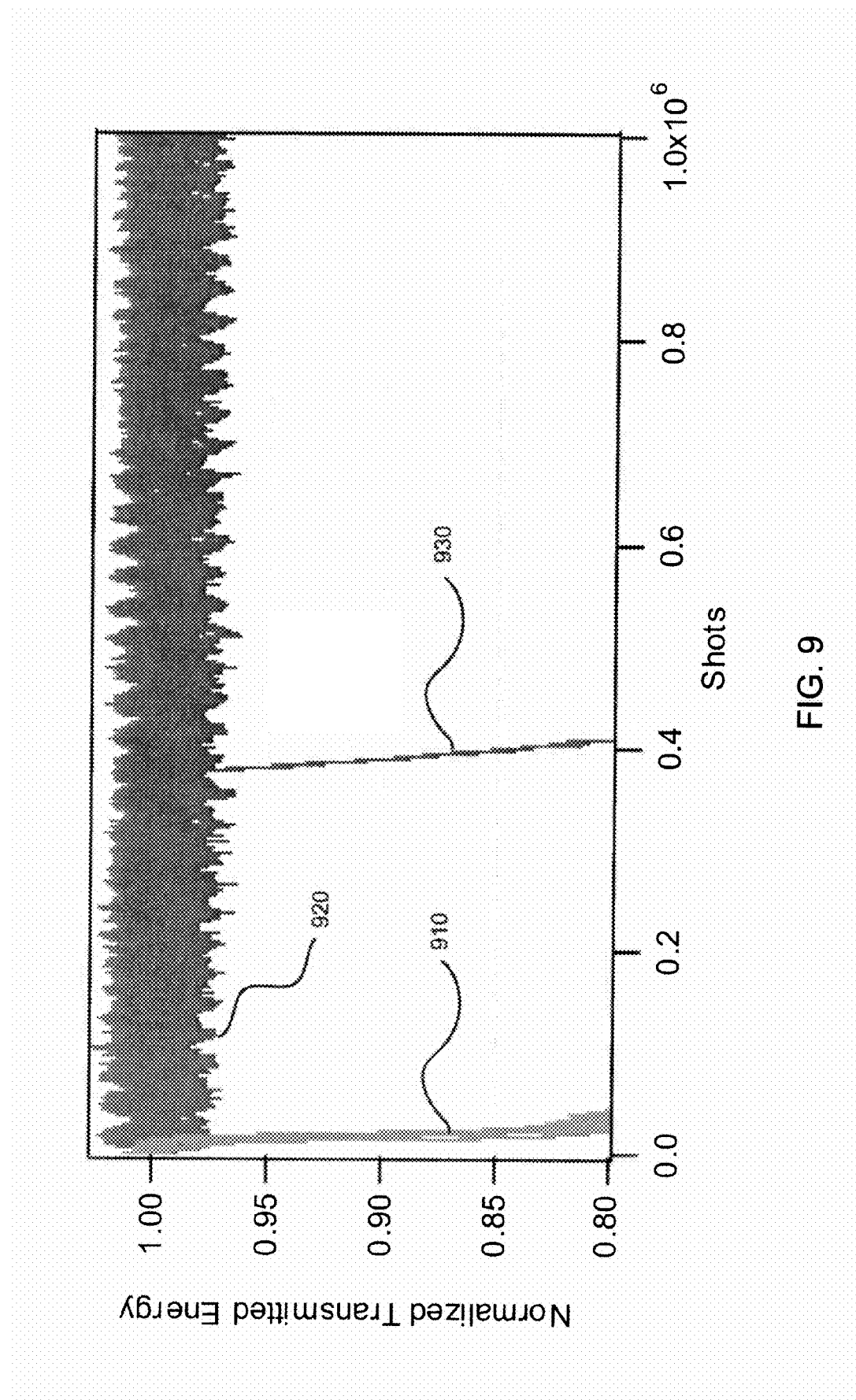
FIG. 9 is a plot illustrating the normalized transmitted energy for a series of threshold measurements performed on a bare fused silica substrate in a flowing mixture of toluene in synthetic air from FIG. 6A as compared to the normalized transmitted energy for a series of threshold measurements performed on a bare fused silica substrate in a flowing mixture of toluene and water vapor in synthetic air.

FIG. 9 is a plot illustrating the normalized transmitted energy 910 for a series of threshold measurements performed on a bare fused silica substrate in a flowing mixture of toluene in synthetic air from FIG. 6A. This result is compared to the normalized transmitted energy 920 for a series of threshold measurements performed on a bare fused silica substrate in a wet flowing mixture of toluene and water vapor in synthetic air. In this wet flowing mixture, the concentration of toluene was 300 ppm and the concentration of water vapor was 3400 ppm.

In this wet flowing mixture experiment, substrate 402 was observed to last for greater than 1×10$^6$ shots in nine out of ten experiments. Without wishing to be bound by any theory, the inventors attribute the experiment where the normalized transmitted energy fell below 90% to particulate contamination. This failure was at 3.9×10$^5$ shots, giving a calculated minimum damage threshold of greater than $(9.4\pm1.9)\times10^5$ shots. The calculated damage threshold is considered a minimum threshold because most of the experiments were stopped before failure was observed. Even so, the calculated minimum damage threshold is a dramatic increase in the life of substrate 402 as compared to the calculated damage threshold of $(1.8\pm0.2)\times10^4$ shots for the dry flowing mixture.

Figure 10:
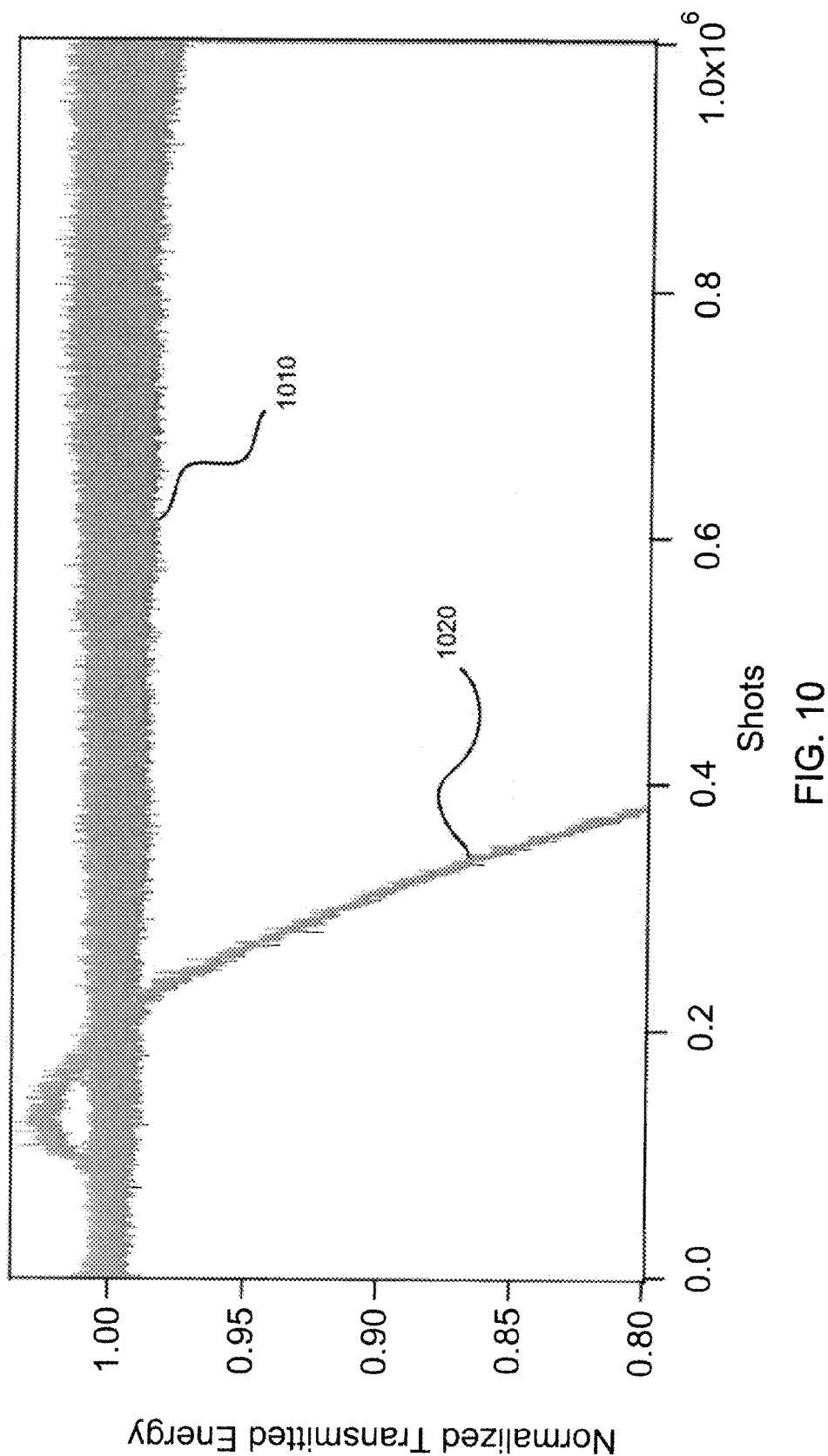
FIG. 10 is a plot illustrating the normalized transmitted energy for a series of threshold measurements performed on a bare fused silica substrate in a flowing mixture of toluene and methanol in synthetic air.

FIG. 10 is a plot illustrating the normalized transmitted energy for a series of threshold measurements performed on a bare fused silica substrate in a wet flowing mixture of toluene and methanol in synthetic air. In this wet flowing mixture, the concentration of toluene was 300 ppm and the concentration of methanol was 4500 ppm. As seen in FIG. 10, the normalized transmitted energy 1010 did not fall below 90% before 1×10$^6$ shots in nine out of ten experiments; however the substrate failed at approximately 3.8× 10$^5$ shots in one experiment (1020). When the wet flowing mixture with methanol was introduced, the calculated minimum damage threshold was greater than $(9.3\pm2.2)\times10^5$ shots. This calculated minimum damage threshold is also a dramatic increase in the life of substrate 402 as compared to the calculated damage threshold of $(1.8\pm0.2)\times10^4$ shots for the dry flowing mixture.

Figure 11:
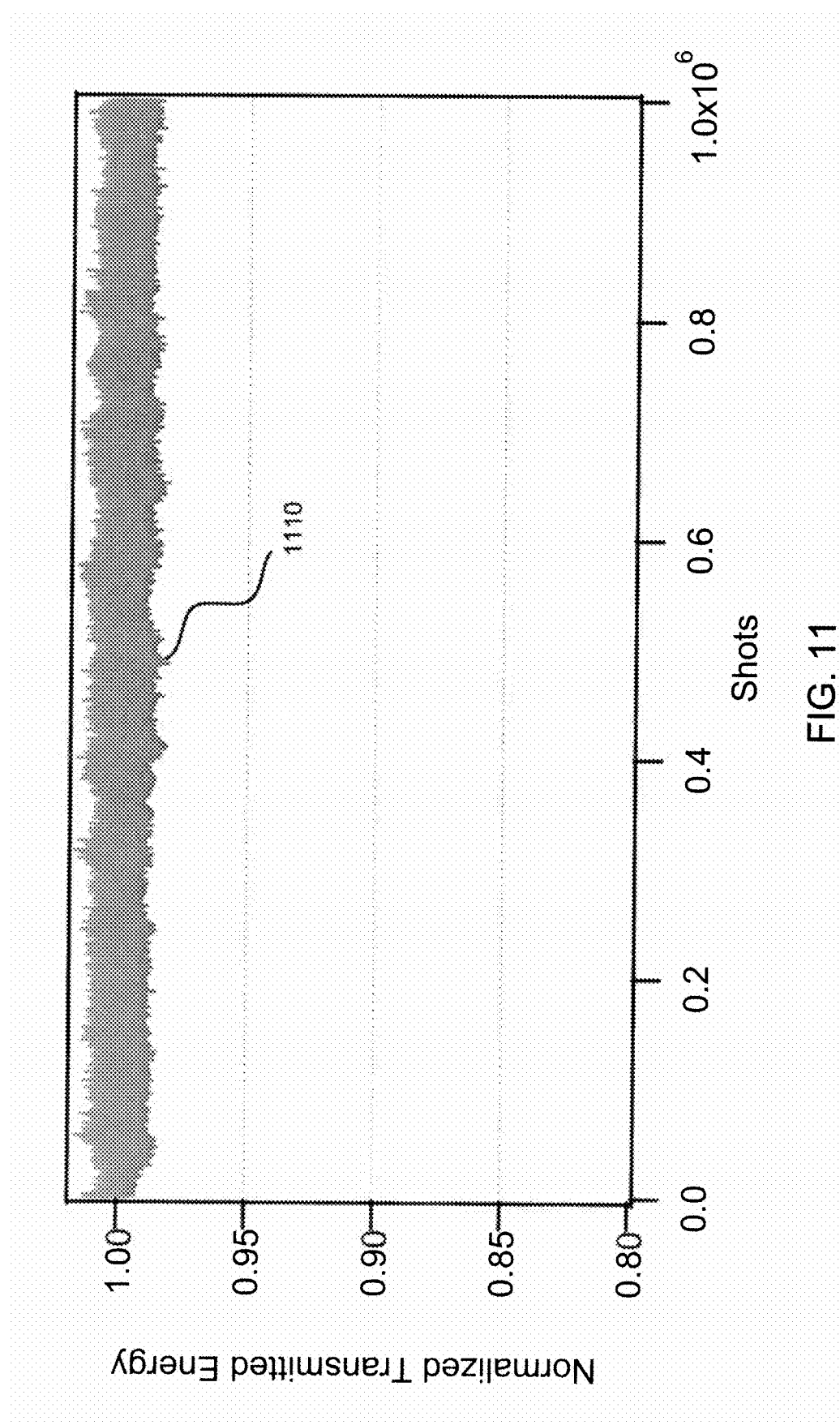
FIG. 11 is a plot illustrating the normalized transmitted energy for a series of threshold measurements performed on a bare fused silica substrate in a flowing mixture of toluene and ethanol in synthetic air.

FIG. 11 is a plot illustrating the normalized transmitted energy 1110 for a series of threshold measurements performed on a bare fused silica substrate in a wet flowing mixture of toluene and ethanol in synthetic air. In the wet flowing mixture, the concentration of toluene was 300 ppm and the concentration of ethanol was 4900 ppm. As seen in FIG. 11, the normalized transmitted energy 1110 did not fall below 90% before $1\times10^6$ shots in all eleven runs. When the wet flowing mixture with ethanol was introduced, the calculated minimum damage threshold was greater than $1\times10^6$ shots. This calculated minimum damage threshold is an even more dramatic increase in the life of substrate 402 as compared to the calculated damage threshold of $(1.8\pm0.2)\times10^4$ shots for the dry flowing mixture.

The calculated damage thresholds for different tested flowing mixtures in synthetic air with a 300 ppm concentration of toluene are summarized in TABLE 3.

TABLE 3

| Gas Phase Additive (concentration in ppm) | Calculated Damage Threshold (shots) | Number of Experiments |
|---|---|---|
| None | 18,000 ± 2,100 | 9 |
| Water Vapor (3400) | >940,000 ± 190,000 | 10 |
| Methanol (4500) | >930,000 ± 220,000 | 10 |
| Ethanol (4900) | >1,000,000 | 11 |

As seen in TABLE 3, the calculated damage threshold increases dramatically when certain gas phase additives are introduced to test chamber 400. Without wishing to be bound by any theory, the inventors attribute this increase to the introduction of a gas phase additive that has a greater affinity for an optical component, e.g., substrate 402, than does a contaminant, e.g., toluene. The additive inhibits binding of the contaminant to the surface of the optical component, thus reducing or eliminating degradation of the optic through mechanisms such as light transmission loss, increased light scatter, and obscuration. The inhibited degradation results in longer life for the optical component.

Figure 12:
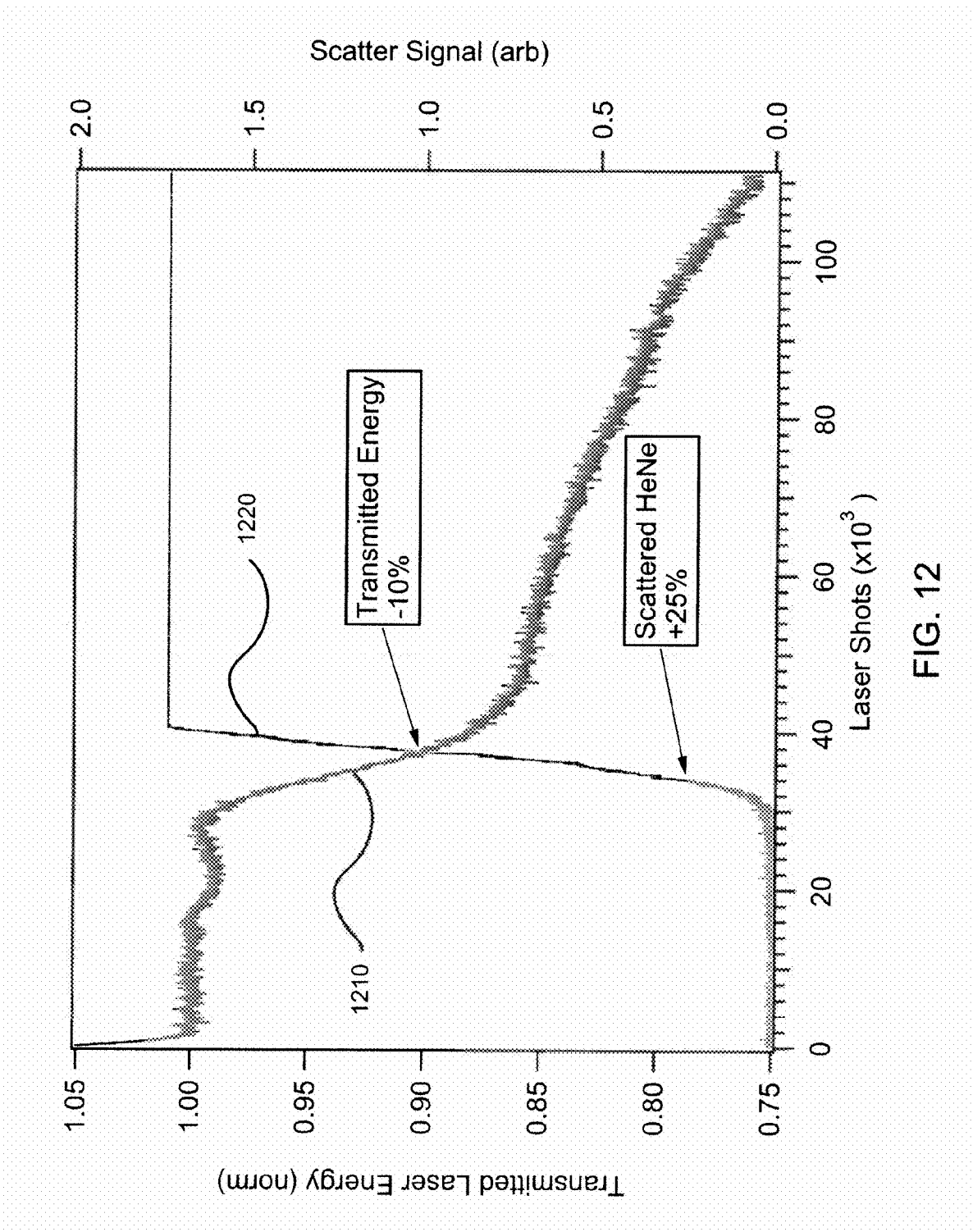
FIG. 12 is a plot illustrating the normalized scatter signal of the HeNe laser and the transmitted Nd:YAG laser energy as a function of the number of laser shots.

FIG. 12 is a plot illustrating the transmitted Nd:YAG laser energy 1210 as a function of the number of laser shots and the normalized scatter signal 1220 of HeNe laser 310. Laser energy 1210 was calculated as the laser energy measured by energy meter 395 over the laser energy measured by energy meter 350 from FIG. 3. To comply with International Organization for Standardization (ISO) 11254: Lasers and Laser-Related Equipment (2000), laser energy 1210 and scatter signal 1220 were calibrated such that their normalized transmitted laser energy would intersect at approximately 0.90, which occurred at 37,358 laser shots. It should be noted that after approximately 40,000 laser shots, scatter signal 1220 flattened out which the inventors attribute, without wishing to be bound by any theory, to saturation of the photodiode and/or amplifier.

FIG. 13 is an image of three damage sites 1310, 1320, 1330 produced on substrate 402 from three experiments with flowing mixtures of toluene, nitrogen, oxygen, and/or ethanol. Damage site 1310 resulted from an experiment where the flowing mixture included nitrogen and 300 ppm of toluene. Damage site 1310 has a dark black ring, an indication of C-LID. Damage site 1320 resulted from an experiment where the flowing mixture included synthetic air, e.g., 80% $N_2$ and 20% $O_2$, and 300 ppm of toluene. Damage site 1320 has a black ring exhibiting C-LID less severe than damage site 1310. Damage site 1330 resulted from an experiment where the flowing mixture included 300 ppm of toluene, synthetic air, e.g., 80% $N_2$ and 20% $O_2$, and 4900 ppm of ethanol. As seen in FIG. 13, the distance between damage site 1310 and damage site 1330 was measured to be 12 mm. Damage site 1330 shows no discoloration and substrate 402 may not be damaged. The inventors attribute, without wishing to be bound by any theory, the inhibited damage to the introduction of ethanol into the flowing mixture.

While preferred embodiments of the invention are described herein, it will be apparent to one skilled in the art that various changes and modifications may be made. The appended claims are intended to cover all such changes and modifications that fall within the true spirit and scope of the invention.

What is claimed:

1. A system for inhibiting contamination enhanced laser induced damage caused by a laser beam, the system comprising: a housing configured to maintain a sealed gas environment or vacuum, having a gas phase contaminant therein, and having a laser source therein, wherein the laser source generates the laser beam; an optical component, disposed within the housing, that is a part of the laser source or through which the laser beam travels, wherein the optical component is transmissive and controls a path of the laser beam; a water or alcohol container operatively coupled to the housing; a delivery system configured to introduce water or alcohol in a gas phase into the housing from the container; a sensor configured to sense an environmental characteristic within the housing and to generate an output based on the sensed environmental characteristic; and a controller, disposed within the housing, configured to receive the output of the sensor and based on the output of the sensor to cause the delivery system to introduce gas phase water or alcohol into the housing from the container in an amount sufficient to generate and maintain a layer of the water or alcohol adsorbed to the optical component from the gas phase and covering a surface of the optical component, the layer leaving minimal area on the surface of the optical component via which the contaminant adsorbs or absorbs to the surface and displacing the contaminant from the surface of the optical component so as to inhibit damage to the optical component resulting from contact between the contaminant, the optical component, and the laser beam.

2. The system of claim 1, wherein the alcohol comprises methanol.

3. The system of claim 1, wherein the alcohol comprises ethanol.

4. The system of claim 1, wherein the optical component includes a coating, wherein the coating reduces reflections of the laser beam.

5. The system of claim 1, wherein the optical component includes a coating, the coating enhances an affinity of the gas phase water or alcohol to adsorb to the optical component.

6. The system of claim 1, wherein the gas phase contaminant comprises toluene.

7. The system of claim 1, wherein the optical component having the water or alcohol adsorbed thereto transmits at least 1 million laser shots therethrough minimizes contamination enhanced laser induced damage (C-LID) to the optical component.

8. The system of claim 1, wherein the delivery system introduces the gas phase water or alcohol into the housing at a concentration of at least 3400 ppm.

9. The system of claim 1, wherein the optical component comprises fused silica.

10. The system of claim 1, wherein the water or alcohol a sorbent is in a condensed phase within the container and wherein the delivery system is configured to volatilize the condensed phase water or alcohol into the gas phase.

11. A method for reducing contamination enhanced laser induced damage caused by a laser beam, the method comprising: providing a housing maintaining a sealed gas environment or vacuum having a gas phase contaminant therein, and having a laser source therein, wherein the laser source generates the laser beam; disposing within the housing an optical component that is transmissive and is a part of the laser source or through which the laser beam travels; operatively coupling to the housing a water or alcohol container; providing a delivery system; introducing water or alcohol in a gas phase via the delivery system into the housing from the container; providing a sensor; sensing an environmental characteristic within the housing via the sensor and generating an output based on the sensed environmental characteristic; providing a controller, disposed within the housing; and receiving the output of the sensor with the controller and based on the output of the sensor controlling the delivery system to introduce gas phase water or alcohol into the housing from the container to generate and maintain a layer of the water or alcohol adsorbed to the optical component that covers a surface of the optical component, the layer leaving minimal area on the surface of the optical component via which the contaminant adsorbs or absorbs to the surface and displacing the contaminant from the surface of the optical component so as to inhibit damage to the optical component resulting from contact between the contaminant, the optical component, and the laser beam.

12. The method of claim 11, wherein the alcohol comprises methanol.

13. The method of claim 11, wherein the alcohol comprises ethanol.

14. The method of claim 11, wherein the optical component includes a coating, wherein the coating reduces reflections of the laser beam.

15. The method of claim 11, wherein the optical component includes a coating, the coating enhances an affinity of the gas phase water or alcohol to adsorb to the optical component.

16. The method of claim 11, wherein the gas phase contaminant comprises toluene.

17. The method of claim 11, comprising transmitting at least 1 million laser shots through the optical component having the water or alcohol adsorbed thereto minimizes contamination enhanced laser induced damage (C-LID) to the optical component.

18. The method of claim 11, wherein the gas phase water or alcohol is introduced to the housing at a concentration of at least 3400 ppm.

19. The method of claim 11, wherein the optical component comprises fused silica.

20. The method of claim 11, wherein the water or alcohol is in a condensed phase within the container and wherein the introducing step comprises volatilizing the water or alcohol into the gas phase.

* * * * *